US011248064B2

(12) United States Patent
Yasumoto et al.

(10) Patent No.: US 11,248,064 B2
(45) Date of Patent: Feb. 15, 2022

(54) CONJUGATED DIENE POLYMER, CONJUGATED DIENE POLYMER COMPOSITION, AND TIRE

(71) Applicants: Japan Elastomer Co., Ltd., Tokyo (JP); Asahi Kasei Kabushiki Kaisha, Tokyo (JP)

(72) Inventors: Atsushi Yasumoto, Tokyo (JP); Hideki Yamasaki, Tokyo (JP)

(73) Assignees: Japan Elastomer Co., Ltd., Tokyo (JP); Asahi Kasei Kabushiki Kaisha, Tokyo (JP)

( * ) Notice: Subject to any disclaimer, the term of this patent is extended or adjusted under 35 U.S.C. 154(b) by 254 days.

(21) Appl. No.: 16/483,856

(22) PCT Filed: Feb. 7, 2018

(86) PCT No.: PCT/JP2018/004158
§ 371 (c)(1),
(2) Date: Aug. 6, 2019

(87) PCT Pub. No.: WO2018/147312
PCT Pub. Date: Aug. 16, 2018

(65) Prior Publication Data
US 2020/0010579 A1 Jan. 9, 2020

(30) Foreign Application Priority Data
Feb. 8, 2017 (JP) .............................. JP2017-021331

(51) Int. Cl.
| | | |
|---|---|---|
| C08C 19/25 | (2006.01) | |
| B60C 1/00 | (2006.01) | |
| B60C 11/00 | (2006.01) | |
| C08F 236/10 | (2006.01) | |
| C08L 15/00 | (2006.01) | |
| C08F 236/04 | (2006.01) | |
| C08L 9/06 | (2006.01) | |

(52) U.S. Cl.
CPC ................ *C08C 19/25* (2013.01); *B60C 1/00* (2013.01); *B60C 1/0016* (2013.01); *B60C 11/0008* (2013.01); *C08F 236/04* (2013.01); *C08F 236/10* (2013.01); *C08L 9/06* (2013.01); *C08L 15/00* (2013.01); *B60C 2011/0025* (2013.01); *C08L 2205/025* (2013.01)

(58) Field of Classification Search
CPC ..... B60C 11/0008; B60C 1/00; B60C 1/0016; B60C 2011/0025; C08L 15/00; C08L 9/06; C08L 2205/02; C08L 2205/025; C08C 19/44; C08C 19/25; C08F 236/04; C08F 236/10

See application file for complete search history.

(56) References Cited

U.S. PATENT DOCUMENTS

| | | | |
|---|---|---|---|
| 4,737,535 A * | 4/1988 | Furukawa | ............. B60C 1/0016 524/113 |
| 4,843,120 A | 6/1989 | Halasa et al. | |
| 6,077,899 A | 6/2000 | Yatsuyanagi et al. | |
| 2008/0319151 A1 | 12/2008 | Oshima | |
| 2011/0230593 A1 | 9/2011 | Kondo | |
| 2012/0108736 A1 | 5/2012 | Chen et al. | |
| 2013/0059965 A1 | 3/2013 | Hirose | |
| 2014/0011944 A1 | 1/2014 | Kondo | |
| 2014/0213721 A1 | 7/2014 | Yamada et al. | |
| 2014/0329930 A1 | 11/2014 | Sato | |
| 2014/0357759 A1 | 12/2014 | Matsumoto et al. | |
| 2015/0183962 A1 | 7/2015 | Belmont et al. | |
| 2017/0204205 A1 * | 7/2017 | Choi | ....................... C08F 36/04 |
| 2018/0117967 A1 | 5/2018 | Higa et al. | |

FOREIGN PATENT DOCUMENTS

| | | |
|---|---|---|
| CN | 103958600 A | 7/2014 |
| EP | 0924256 A1 | 6/1999 |
| EP | 1640183 A1 | 3/2006 |
| EP | 2338919 A1 | 6/2011 |
| EP | 2716700 A1 | 4/2014 |
| JP | S57-180615 A | 11/1982 |
| JP | H08-231767 A | 9/1996 |
| JP | H09-067469 A | 3/1997 |
| JP | H09-324077 A | 12/1997 |

(Continued)

OTHER PUBLICATIONS

English machine translation of JP 2008-231209 (Year: 2008).*
Budeeva et al., "Chemical Modification of a Random Copolymer of Styrene, Isoprene, and Butadiene, Prepared by Anionic Polymerization in Solution," Russian Journal of Applied Chemistry, 87: 1536-1546 (2014).
S-SBR development strategy for eco-friendly high-performance tires, Tire technology EXPO 2016.
International Preliminary Report on Patentability issued in corresponding International Patent Application No. PCT/JP2018/004158 dated Aug. 22, 2019.

(Continued)

*Primary Examiner* — Angela C Scott
(74) *Attorney, Agent, or Firm* — Morgan, Lewis & Bockius LLP

(57) ABSTRACT

A conjugated diene polymer satisfying following conditions (1) to (4):
(1) the conjugated diene polymer has two or more peaks in a molecular weight distribution curve obtained by measurement with gel permeation chromatography (GPC);
(2) the molecular weight distribution curve contains a peak (A) having a peak molecular weight of 500,000 to 2,500,000 and a peak (B) having a peak molecular weight of 150,000 to 600,000;
(3) a total value of an area of the peak (A) and an area of the peak (B) is 70% or more of a total area of the molecular weight distribution curve; and
(4) an absolute value of difference between a glass transition temperature of a conjugated diene polymer in the peak (A) (Tg (A)) and a glass transition temperature of a conjugated diene polymer in the peak (B) (Tg (B)) is 2° C. to 30° C.

15 Claims, No Drawings

(56) References Cited

FOREIGN PATENT DOCUMENTS

| | | |
|---|---|---|
| JP | 2001-131230 A | 5/2001 |
| JP | 2004-168813 A | 6/2004 |
| JP | 2008-231197 A | 10/2008 |
| JP | 2008-231209 A | 10/2008 |
| JP | 2009-030027 A | 2/2009 |
| JP | 2009-102612 A | 5/2009 |
| JP | 2011-213988 A | 10/2011 |
| JP | 2011-246561 A | 12/2011 |
| JP | 2012-514115 A | 6/2012 |
| JP | 2012-172077 A | 9/2012 |
| JP | 2013-139504 A | 7/2013 |
| JP | 2015-508844 A | 3/2015 |
| JP | 2015-110703 A | 6/2015 |
| JP | 2016-132764 A | 7/2016 |
| WO | 2012/165038 A1 | 12/2012 |
| WO | 2013/035589 A1 | 3/2013 |
| WO | 2013/081053 A1 | 6/2013 |
| WO | WO-2016085285 A1 * 6/2016 ............... B60C 1/00 |
| WO | 2016/194316 A1 | 12/2016 |

OTHER PUBLICATIONS

Supplementary European Search Report issued in counterpart European Patent Application No. 18751974.9 dated Feb. 18, 2020.
International Search Report issued in corresponding International Patent Application No. PCT/JP2018/004158 dated May 1, 2018.

* cited by examiner

CONJUGATED DIENE POLYMER, CONJUGATED DIENE POLYMER COMPOSITION, AND TIRE

TECHNICAL FIELD

The present invention relates to a conjugated diene polymer, a conjugated diene polymer composition, and a tire.

BACKGROUND ART

Environmental considerations including reduction of carbon dioxide emissions have become a social demand in recent years. Specifically, higher fuel efficiency has been increasingly demanded for automobiles.

In such current circumstances, development of materials with low rolling resistance (low hysteresis loss) has been desired for materials of automobile tires, in particular, of tire treads, which are to come into contact with the ground.

For safety, on the other hand, development of materials with superior wet skid resistance and abrasion resistance enough for practical use has been desired.

To achieve these properties, various conjugated diene polymers have been proposed. For example, a conjugated diene polymer has been proposed as a rubber for automobile tires, the conjugated diene polymer obtained by modifying an end of a conjugated diene polymer with a compound having an amino group and an alkoxysilyl group (e.g., see Patent Literatures 1 and 2).

Carbon black, silica, and so forth have been conventionally used as a reinforcing filler for materials of tire treads.

Use of silica is advantageous in that low hysteresis loss and enhanced wet skid resistance can be achieved. However, the surface of silica is hydrophilic in contrast to carbon black, the surface of which is hydrophobic, and hence silica has disadvantages of low affinity for conjugated diene polymer and poor dispersibility as compared with carbon black. From such a viewpoint, silica needs further addition of a silane coupling agent or the like for the purpose of improving the dispersibility of the silica or providing bonds between silica and conjugated diene rubber.

Attempts have been recently made to reduce hysteresis loss by introducing a functional group having affinity for or reactivity to silica to an active end of a rubbery polymer to improve the dispersibility of silica in the rubbery polymer and further capping the modified polymer end portion through bonding to a silica particle.

On the other hand, a technique is known such that introduction of an amino group, which has affinity for carbon black, to a polymerization-starting end of a rubbery polymer allows carbon black to capture thereon the polymerization-starting end, which has high motility, leading to reduction of hysteresis loss.

Patent Literature 1 proposes a technique of introducing an amino group, which has high affinity for carbon black, to a polymerization-starting end of a rubbery polymer and introducing an amino group-containing alkoxysilane to a terminating end to provide a modified rubbery polymer in which the ends of the rubbery polymer are captured by both silica and carbon black, by which further reduction of hysteresis loss can be achieved for a modified rubbery polymer composition produced by using such a modified rubbery polymer.

Moreover, Patent Literature 2 proposes a technique relating to a modified conjugated diene polymer having superior balance between low hysteresis loss and wet skid resistance, abrasion resistance enough for practical use, and superior processability in use for automobile tires, and to a method for producing the modified conjugated diene polymer, where a polymerization step is first performed, the polymerization step including subjecting a conjugated diene compound or a conjugated diene compound and a vinyl aromatic compound to polymerization or copolymerization with a polymerization initiator containing a compound having a specific structure and having at least one nitrogen atom in the molecule and an organic lithium compound to obtain a conjugated diene polymer having an active end; and a modification step is subsequently performed, the modification step including reacting the conjugated diene polymer with a compound having a specific structure, to obtain a modified conjugated diene polymer.

CITATION LIST

Patent Literature

Patent Literature 1: Japanese Patent Laid-Open No. 2001-131230
Patent Literature 2: International Publication No. WO 2013/035589

SUMMARY OF INVENTION

Technical Problem

Although the modified rubbery polymer composition described in Patent Literature 1 exhibits effect of reducing hysteresis loss by virtue of the functional group introduced to each end of polymer, however, reaction proceeds between the modifying group at an end of the molecular chain of the modified polymer and an inorganic filler such as silica to increase the viscosity during kneading, which tends to disadvantageously lead to deteriorated processability such as difficulty in kneading and frequent occurrence of roughness or splitting in a sheet in processing into a sheet after kneading.

In addition, the method for producing a modified conjugated diene polymer described in Patent Literature 2 still has points to be improved in order for the modified conjugated diene polymer to stably exhibit superior balance between low hysteresis loss and wet skid resistance.

In summary, various techniques of introducing a modifier to conjugated diene polymer have been previously proposed to attain enhanced fuel-saving performance, and a certain degree of effect has been obtained with respect to fuel-saving performance; however, problems such as deteriorated processability are caused, on the other hand.

In blending a filler such as silica in modified conjugated diene polymer in production of tires, if the Mooney viscosity of the modified conjugated diene polymer is high, homogeneous stress is not applied in kneading, which complicates kneading and deteriorates the dispersibility of the filler such as silica, leading to deteriorated processability. The processability is advantageously improved if the amount of low-molecular-weight components is increased as a countermeasure, but the abrasion resistance is lowered and the modifying group concentration decreases to disadvantageously lead to lowered fuel-saving performance.

Therefore, conventional methods, namely, changing a modifier or simple setting of molecular weight are disadvantageously incapable of providing a modified conjugated diene polymer having superior fuel-saving performance and achieving abrasion resistance and processability in combination.

In view of the above-described problems inherent in the conventional techniques, an object of the present invention is to provide a conjugated diene polymer which has abrasion resistance enough for practical use, and exhibits superior processability in use for automobile tires.

Solution to Problem

The present inventors diligently examined to solve the above-described problems inherent in the conventional techniques, and found that a conjugated diene polymer having at least two peaks in a molecular weight distribution curve, where a low-molecular-weight peak and a high-molecular weight peak are present at specific positions and the total value of the peak areas of the peaks is equal to or more than a specific range relative to the whole of the molecular weight distribution curve, and the absolute value of difference between the glass transition temperature of a conjugated diene polymer in the low-molecular-weight peak and the glass transition temperature of a conjugated diene polymer in the high-molecular-weight peak is within a specific numerical range, is superior in processability and has abrasion resistance enough for practical use in use for automobile tires, and thus the present invention was completed.

Specifically, the present invention is as follows.

[1]
A conjugated diene polymer satisfying following conditions (1) to (4):

(1) the conjugated diene polymer has two or more peaks in a molecular weight distribution curve obtained by measurement with gel permeation chromatography (GPC);

(2) the molecular weight distribution curve contains a peak (A) having a peak molecular weight of 500,000 to 2,500,000 and a peak (B) having a peak molecular weight of 150,000 to 600,000;

(3) a total value of an area of the peak (A) and an area of the peak (B) is 70% or more of a total area of the molecular weight distribution curve; and (4) an absolute value of difference between a glass transition temperature of a conjugated diene polymer in the peak (A) (Tg (A)) and a glass transition temperature of a conjugated diene polymer in the peak (B) (Tg (B)) is 2° C. to 30° C.

The conjugated diene polymer according to [1], satisfying following expression (I):

$$Tg(B) > Tg(A) \qquad (I)$$

[3]
The conjugated diene polymer according to [1] or [2], wherein Tg (A) is −70° C. to −15° C. and Tg (B) is −68° C. to −13° C.

[4]
The conjugated diene polymer according to any one of [1] to [3], wherein the conjugated diene polymer in the peak (A) contains 10 to 50% by mass of a vinyl aromatic compound and has a 1,2-vinyl bond content of 20 to 70%.

[5]
The conjugated diene polymer according to any one of [1] to [4], wherein the conjugated diene polymer in the peak (B) contains 10 to 50% by mass of a vinyl aromatic compound and has a 1,2-vinyl bond content of 25 to 70%.

[6]
The conjugated diene polymer according to any one of [1] to [5], wherein the total value of the area of the peak (A) and the area of the peak (B) is 80% or more of the total area of the molecular weight distribution curve.

[7]
The conjugated diene polymer according to any one of [1] to [6], wherein the area of the peak (B) is 30% to 70% of the total area of the molecular weight distribution curve.

[8]
The conjugated diene polymer according to any one of [1] to [7], wherein the absolute value of difference between the glass transition temperature of the conjugated diene polymer in the peak (A) (Tg (A)) and the glass transition temperature of the conjugated diene polymer in the peak (B) (Tg (B)) is 2° C. to 20° C.

[9]
The conjugated diene polymer according to any one of [1] to [8], wherein a nitrogen content is 50 to 600 ppm.

[10]
The conjugated diene polymer according to any one of [1] to [9], wherein a proportion of modified polymer chains in the conjugated diene polymer is 30 to 99%.

[11]
The conjugated diene polymer according to any one of [1] to [10], wherein a molecular weight distribution of the peak (A) is lower than 1.50.

[12]
The conjugated diene polymer according to any one of [1] to [11], wherein one glass transition temperature is observed in measurement with DSC.

[13]
The conjugated diene polymer according to any one of [1] to [12], wherein the peak molecular weight of the peak (A) is higher than the peak molecular weight of the peak (B).

[14]
A conjugated diene polymer composition comprising: 100 parts by mass of a rubber composition comprising the conjugated diene copolymer according to any one of [1] to [13];
1 part by mass to 150 parts by mass of a reinforcing filler; and
0.1 parts by mass to 20 parts by mass in total of a vulcanizing agent and a vulcanization accelerator.

[15]
A tire comprising the conjugated diene polymer composition according to [14].

Advantageous Effects of Invention

The present invention can provide a conjugated diene polymer having abrasion resistance enough for practical use and being superior in processability even in use for tires.

DESCRIPTION OF EMBODIMENTS

Hereinafter, embodiments of the present invention (hereinafter, referred to as "the present embodiment") will be described in detail; however, the present invention is not limited to modes illustrated in the following, and can be embodied with various modifications without departing from the spirit of the invention.

[Conjugated Diene Polymer]

The conjugated diene polymer according to the present embodiment is a conjugated diene polymer satisfying the following conditions (1) to (4):

(1) the conjugated diene polymer has two or more peaks in a molecular weight distribution curve obtained by measurement with gel permeation chromatography (GPC);

(2) the molecular weight distribution curve contains a peak (A) having a peak molecular weight of 500,000 to 2,500,000 and a peak (B) having a peak molecular weight of 150,000 to 600,000;

(3) the total value of the area of the peak (A) and the area of the peak (B) is 70% or more of the total area of the molecular weight distribution curve; and (4) the absolute value of difference between the glass transition temperature of a conjugated diene polymer in the peak (A) (Tg (A)) and the glass transition temperature of a conjugated diene polymer in the peak (B) (Tg (B)) is 2° C. to 30° C.

(Weight-Average Molecular Weight)

The weight-average molecular weight of the conjugated diene polymer according to the present embodiment is preferably 100,000 to 2,000,000, more preferably 200,000 to 1,500,000, and even more preferably 350,000 to 1,100,000, for processability and the performance such as abrasion resistance. The weight-average molecular weight of the conjugated diene polymer can be measured by GPC (gel permeation chromatography).

(Peak Molecular Weight)

The conjugated diene polymer according to the present embodiment has two or more peaks in a molecular weight distribution curve obtained by measurement with GPC.

The term "peak" in a molecular weight distribution curve in the present embodiment refers to a peak having an area of 1.0% or larger with a peak top as the total area of a molecular weight distribution curve obtained by measurement with GPC is defined as 100%.

The term "peak top" refers to a point of a local maximum between base lines or local minimums.

If one peak is present, cold flow (a phenomenon that molded rubber flows out and deforms at room temperature) is intense, and moreover lower strength is imparted to a conjugated diene polymer composition, and thus such a case is not preferred.

If two or more peaks are present, on the other hand, the cold flow can be easily prevented, and enhanced balance can be achieved between abrasion resistance and processability. To prevent the cold flow, it is preferable that two or more peaks each having an area of 20% or larger to the total area of a molecular weight distribution curve obtained by measurement with GPC be present.

Conjugated diene polymer having two or more peaks in the molecular weight distribution curve may be produced in one polymerization, or produced by mixing polymers having different peak molecular weights together.

Examples of effective methods for obtaining conjugated diene polymer having two or more peaks in one polymerization include methods of controlling the loading of a modifier or the type of a modifier.

The conjugated diene polymer according to the present embodiment has, as peaks in the molecular weight distribution curve, a peak (A) which is a peak having a peak molecular weight of 500,000 to 2,500,000 and a peak (B) which is a peak having a peak molecular weight of 150,000 to 600,000. For processability and abrasion resistance, it is preferable that the peak molecular weight of the peak (A) be higher than the peak molecular weight of the peak (B).

If a plurality of peaks is present in the peak molecular weight range of 500,000 to 2,500,000, a peak having the largest peak height is regarded as the peak (A). Similarly, if a plurality of peaks is present in the peak molecular weight range of 150,000 to 600,000, a peak having the largest peak height except the peak (A) is regarded as the peak (B).

For enhanced abrasion resistance and enhanced bale formation in production, the peak molecular weight of the peak (A) is 500,000 to 2,500,000, preferably 500,000 to 2,000,000, more preferably 500,000 to 1,800,000, and even more preferably 500,000 to 1,500,000.

For enhanced processability and reduced hysteresis loss, and additionally for preventing adhesion in production, the peak molecular weight of the peak (B) is 150,000 to 600,000, preferably 150,000 to 400,000, more preferably 150,000 to 380,000, and even more preferably 150,000 to 350,000.

The peak molecular weight of the peak (A) and the peak molecular weight of the peak (B) can be controlled in the above numerical ranges through the loading of a polymerization initiator and the type of a coupling agent.

For production stability, the number of peaks except the peak (A) and the peak (B) is preferably three or less, and more preferably two or less.

If any peak except the peak (A) and the peak (B) is present, the peak molecular weight of the peak except the peak (A) and the peak (B) is preferably 50,000 to 200,000, and more preferably 50,000 to 180,000, for balance between processability and abrasion resistance.

(Molecular Weight Distribution)

As the total area of a molecular weight distribution curve obtained for the conjugated diene polymer according to the present embodiment in measurement with GPC is defined as 100%, the total value of the area of the peak (A) and the area of the peak (B) is 70% or more, preferably 75% or more, and more preferably 80% or more, and even more preferably 85% or more, for balance between abrasion resistance and processability.

The area of the peak (A) is preferably 20% to 80%, more preferably 30% to 80%, and even more preferably 35% to 75%, for balance between abrasion resistance and processability. The area of the peak (B) is preferably 20% to 80%, more preferably 30% to 80%, even more preferably 30% to 75%, and further preferably 30% to 70%.

In the case that peaks are overlapping in calculation of the peak area of each peak, a perpendicular is drawn from a local minimum present between peaks to the baseline, and the areas of the peaks divided by the perpendicular are calculated.

The area of the peak (A) and the area of the peak (B) can be controlled in the above numerical ranges through adjusting the loading of a coupling agent and the mixing ratio, in other words, blend ratio between copolymers having different peak molecular weights.

The molecular weight distribution (weight-average molecular weight/number-average molecular weight) of the conjugated diene polymer according to the present embodiment is preferably 1.20 to 3.00, more preferably 1.20 to lower than 2.60, and even more preferably 1.25 to lower than 2.50, for processability and lower hysteresis loss.

The molecular weight distribution of the peak (A) is preferably lower than 1.50, more preferably lower than 1.40, and even more preferably lower than 1.35, for balance between processability and abrasion resistance.

In addition, for low hysteresis loss, the molecular weight distribution of the peak (B) is preferably lower than 1.50, more preferably lower than 1.40, and even more preferably lower than 1.35.

(Glass Transition Temperature)

The glass transition temperature of the conjugated diene polymer according to the present embodiment is preferably −70° C. to −15° C., and more preferably −65° C. to −18° C., for balance between low hysteresis loss and wet skid resistance.

It is particularly preferable that one glass transition temperature be present for the conjugated diene polymer according to the present embodiment as a whole.

In the conjugated diene polymer according to the present embodiment, the absolute value of difference between the glass transition temperature of the conjugated diene polymer in the peak (A) (Tg (A)) and the glass transition temperature of the conjugated diene polymer in the peak (B) (Tg (B)) is 2° C. to 30° C., preferably 2° C. to 25° C., more preferably 2° C. to 20° C., and even more preferably 2° C. to 18° C., for balance among low hysteresis loss, wet skid resistance, and abrasion resistance. The lower limit of the absolute value is preferably 3° C. or higher, and more preferably 4° C. or higher.

To measure the glass transition temperature of the conjugated diene polymer according to the present embodiment and that of the conjugated diene polymer in each peak, the conjugated diene polymer according to the present embodiment is dissolved in chloroform, the conjugated diene polymer component in the peak (A) and the conjugated diene polymer component in the peak (B) are then separately collected through GPC, and the conjugated diene polymers are subjected to desolvation followed by an analysis method with DSC described later in Examples.

The glass transition temperature of the conjugated diene polymer according to the present embodiment can be controlled through the microstructure of the conjugated diene polymer. Controlling the microstructure of the conjugated diene polymer to allow the components in the conjugated diene polymer to be compatible with each other provides the conjugated diene polymer with only one glass transition temperature.

In addition, the absolute value of difference between the glass transition temperature of the conjugated diene polymer in the peak (A) (Tg (A)) and the glass transition temperature of the conjugated diene polymer in the peak (B) (Tg (B)) can be controlled in the above numerical range though blending conjugated diene polymers with different glass transition temperatures.

For improved wet skid resistance, Tg (A) and Tg (B) preferably satisfy the following expression (I):

$$Tg(B) > Tg(A) \quad (I)$$

The glass transition temperature of the conjugated diene polymer in the peak (A) (Tg (A)) is preferably −70° C. to −15° C., and more preferably −65° C. to −18° C., for balance between low hysteresis loss and wet skid resistance. The glass transition temperature of the conjugated diene polymer in the peak (B) (Tg (B)) is preferably −68° C. to −13° C., and more preferably −63° C. to −16° C., for balance between low hysteresis loss and wet skid resistance. It is preferable that each of Tg (A) and Tg (B) simultaneously fall within the corresponding preferred range.

Examples of methods to obtain the conjugated diene polymer satisfying the above expression (I) include a method of blending together a high-molecular-weight conjugated diene polymer in which the peak molecular weight of a peak with the largest area is 500,000 to 2,500,000 and the glass transition temperature is −70° C. to −15° C. and a low-molecular-weight conjugated diene polymer in which the peak molecular weight of a peak with the largest area is 150,000 to 600,000 and the glass transition temperature is higher than that of the high-molecular-weight conjugated diene polymer by 2 to 30° C. The mass ratio between the high-molecular-weight conjugated diene polymer and the low-molecular-weight conjugated diene polymer to be blended is preferably high-molecular-weight conjugated diene polymer:low-molecular-weight conjugated diene polymer=20:80 to 80:20, more preferably 30:70 to 70:30, and even more preferably 35:65 to 70:30.

When the absolute values of the glass transition temperatures of the conjugated diene polymer in the peak (A) with high molecular weight (Tg (A)) and that of the conjugated diene polymer in the peak (B) with low molecular weight (Tg (B)) are different from each other, it follows that the component with higher glass transition temperature and the component with lower glass transition temperature are present as an admixture. It is expected that the component with higher glass transition temperature provides improved abrasion resistance and the component with lower glass transition temperature provides improved processability, and abrasion resistance and processability can be achieved in combination by blending the components into an admixture.

The term "admixture" is defined as a state such that vinyl aromatic contents and vinyl bond contents at three points randomly sampled from 0.1 kg or more of conjugated diene polymer are within an error of ±1%, and peak area percentages for each peak as measured in GPC are within an error of ±3%.

Examples of methods of making an admixture include a method of blending and mixing conjugated diene polymer solutions together to homogeneous state, a method of dissolving solids of conjugated diene polymers in an organic solvent, and a method of kneading solids of conjugated diene polymers together, and the method of blending and mixing conjugated diene polymer solutions together to homogeneous state is preferred.

(Mooney Viscosity)

The Mooney viscosity of the conjugated diene polymer according to the present embodiment is preferably 40 to 90, more preferably 45 to 85, and even more preferably 50 to 80, for production stability and processability.

The Mooney viscosity of the conjugated diene polymer can be controlled in the above numerical range through the loading of a polymerization initiator or the loading of each modifier.

(Nitrogen Content)

The nitrogen content of the conjugated diene polymer according to the present embodiment is preferably 50 to 600 ppm, more preferably 100 to 600 ppm, even more preferably 110 to 580 ppm, and further preferably 120 to 550 ppm, for improved balance among low hysteresis loss, wet skid resistance, and processability.

The nitrogen content of the conjugated diene polymer can be controlled in the above numerical range through use of a polymerization initiator obtained by reacting a compound having at least one nitrogen atom in the molecule and an organic lithium compound, or adjusting the loading of a specific modifier having a nitrogen atom in the molecule and the type of a modifier.

(Structure of Conjugated Diene Polymer, and Production Method Therefor)

The conjugated diene polymer according to the present embodiment may be any one selected from the group consisting of polymer obtained by polymerization of one conjugated diene compound, copolymer obtained by copolymerization of two or more conjugated diene compounds, and copolymer obtained by copolymerization of two or two or more conjugated diene compounds and a vinyl aromatic compound.

The copolymer obtained by copolymerization of a conjugated diene compound and a vinyl aromatic compound may be random copolymer or block copolymer.

Examples of the random copolymer include, but are not limited to, butadiene-isoprene random copolymer, butadiene-styrene random copolymer, isoprene-styrene random copolymer, and butadiene-isoprene-styrene random copolymer.

The composition distribution of monomers in copolymer chains is not limited, and, for example, complete random copolymer, which has an almost statistically random composition, and taper (gradient) random copolymer, which has a composition distributed like a taper, are acceptable. The bonding mode of conjugated diene, that is, the composition including 1,4-bonds and 1,2-bonds may be homogeneous or according to a distribution.

The content of the vinyl aromatic compound in the conjugated diene polymer according to the present embodiment is preferably 10 to 60% by mass, more preferably 11 to 58% by mass, and even more preferably 11 to 55% by mass, for balancing low hysteresis loss and wet skid resistance.

The content of the vinyl aromatic compound can be measured in a manner described later in Examples, and can be controlled in the above numerical range through adjusting the amount of the vinyl aromatic compound blended for polymerization.

The vinyl bond content of a conjugated diene-based compound moiety in the conjugated diene polymer according to the present embodiment is preferably 20 to 70% by mass, more preferably 25 to 70% by mass, even more preferably 25 to 68% by mass, and further preferably 25 to 65% by mass, for abrasion resistance.

The vinyl bond content can be measured in a manner described later in Examples, and can be controlled in the above numerical range through reaction temperature or the loading or type of a polar compound described later.

The content of the vinyl aromatic compound of the conjugated diene polymer in the peak (A) in the present embodiment is preferably 10 to 60% by mass, more preferably 11 to 58% by mass, even more preferably 11 to 55% by mass, and further preferably 10 to 50% by mass, for balancing low hysteresis loss and wet skid resistance.

The content of the vinyl aromatic compound of the conjugated diene polymer in the peak (B) in the present embodiment is preferably 10 to 60% by mass, more preferably 12 to 59% by mass, even more preferably 12 to 56% by mass, and further preferably 10 to 50% by mass, for balancing low hysteresis loss and wet skid resistance.

The conjugated diene polymer according to the present embodiment preferably contains modified polymer chains, and the proportion of modified polymer chains is preferably 30 to 99%, more preferably 70% to 99%, even more preferably 80% to 99%, and further preferably 85% to 99%, for improved balance between low hysteresis loss and wet skid resistance.

The proportion of modified polymer chains in the conjugated diene polymer can be controlled within the above numerical range through use of a polymerization initiator obtained by reacting a compound having at least one nitrogen atom in the molecule and an organic lithium compound, or adjusting the loading of a modifier. It is preferred to add 0.7 to 1.0 mol of a compound having at least one nitrogen atom in the molecule per mole of an organic lithium compound to be actually added.

The proportion of modified polymer chains contained in the conjugated diene polymer can be measured by using a method for measuring proportions of modified polymer chains as shown in Examples.

<Conjugated Diene Compound>

Examples of the conjugated diene compound include, but are not limited to, 1,3-butadiene, isoprene, 2,3-dimethyl-1,3butadiene, 1,3-pentadiene, 3-methyl-1,3-pentadiene, 1,3-heptadiene, and 1,3-hexadiene.

One of these may be used singly, and two or more thereof may be used in combination.

Preferred examples of the conjugated diene compound for industrial availability include 1,3-butadiene and isoprene.

<Vinyl Aromatic Compound>

Examples of the vinyl aromatic compound include, but are not limited to, styrene, α-methylstyrene, p-methylstyrene, vinylethylbenzene, 2-vinylnaphthalene, divinylbenzene, and diphenylethylene.

One of these may be used singly, and two or more thereof may be used in combination. Preferred examples of the compound for industrial availability include styrene.

The block ratio of the vinyl aromatic compound is determined in a method of oxidative decomposition of block copolymer by using tert-butyl peroxide with osmium tetroxide as a catalyst (a method described in I. M. KOLTHOFF et al., J. Polym. Sci. 1, 429 (1946)). The block ratio of the vinyl aromatic compound in the conjugated diene polymer according to the present embodiment is preferably lower than 5% by mass for balance between low hysteresis loss and wet skid resistance.

The microstructure (cis/trans ratio, vinyl bond content) of the conjugated diene polymer according to the present embodiment can be arbitrarily controlled, for example, through polymerization temperature during polymerization, and the type and loading of a polar compound, each described later.

The vinyl bond content of a conjugated diene-based compound moiety of the conjugated diene polymer according to the present embodiment is preferably 20 to 70% by mass, more preferably 25 to 70% by mass, even more preferably 25 to 68% by mass, and further preferably 25 to 65% by mass, for the purpose of achieving good abrasion resistance for use for what is called fuel-saving tires.

In the case that the conjugated diene polymer is a copolymer of butadiene and styrene, the vinyl bond content (1,2-bond content) of the butadiene bonding units can be determined for such vinyl bond content by using a Hampton's method (R. R. Hampton, Analytical Chemistry, 21, 923 (1949)).

In the conjugated diene polymer according to the present embodiment, the 1,2-vinyl bond content of the conjugated diene polymer in the peak (A) is preferably 20 to 70%, more preferably 25 to 70%, and even more preferably 25 to 68%, for balance between fuel-saving properties and abrasion resistance.

In the conjugated diene polymer according to the present embodiment, the 1,2-vinyl bond content of the conjugated diene polymer in the peak (B) is preferably 25 to 70%, more preferably 25 to 68%, and even more preferably 25 to 65%, for balance between fuel-saving properties and abrasion resistance.

The 1,2-vinyl bond contents of the conjugated diene polymer in the peak (A) and the conjugated diene polymer in the peak (B) can be controlled within the above numerical ranges through the loading of a polar compound described later.

If the microstructure (the vinyl bond contents of the conjugated diene polymer) is within the above range and the glass transition temperature of the conjugated diene polymer is in the range of −65° C. to −15° C., a vulcanized product with more superior balance between low hysteresis loss and wet skid resistance can be obtained.

In determination of glass transition temperature, in accordance with ISO 22768: 2006, a DSC curve is recorded while the temperature is raised within a given temperature range, and a peak top (inflection point) in the DSC differential curve is defined as glass transition temperature.

In the case that the conjugated diene polymer according to the present embodiment is modified, the modification reaction can be performed in the polymerization to form a conjugated diene polymer before active end modification or the subsequent process, and it is preferable that the modification reaction be performed in a specific solvent.

Examples of the solvent include, but are not limited to, hydrocarbon solvents such as aliphatic hydrocarbons including butane, pentane, hexane, isopentane, heptane, octane, and isooctane; alicyclic hydrocarbons including cyclopentane, methylcyclopentane, cyclohexane, methylcyclohexane, and ethylcyclohexane; and aromatic hydrocarbons including benzene, toluene, ethylbenzene, and xylene.

One of these may be used singly, and two or more thereof may be used in combination.

The conjugated diene polymer according to the present embodiment can be polymerized by using the above-described specific compounds and performing modification reaction, as necessary.

<Polymerization Initiator>

In the method for producing the conjugated diene polymer according to the present embodiment, a specific polymerization initiator containing a compound having at least one nitrogen atom in the molecule and an organic lithium compound may be used.

The polymerization initiator is preferably a polymerization initiator containing an organic lithium compound having at least one nitrogen atom in the molecule for balance between low hysteresis loss and wet skid resistance, and may contain a nitrogen-free organic lithium compound.

Examples of the compound having at least one nitrogen atom include compounds represented by formulae (1) and (2) below, and the organic lithium compound having at least one nitrogen atom in the molecule may be prepared in advance in a given reactor, or obtained by reacting a compound having at least one nitrogen atom in the molecule and an organic lithium concomitantly with or before polymerization of the conjugated diene polymer.

[Compound having at least one nitrogen atom in molecule]

For the Compound Having at Least One Nitrogen Atom in the molecule, a compound represented by the following formula (1) or (2) can be used.

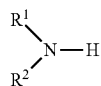
(1)

In the formula (1), $R^1$ and $R^2$ may be the same or different, and are each any one selected from the group consisting of an alkyl group having 1 to 12 carbon atoms, a cycloalkyl group having 3 to 14 carbon atoms, and an aralkyl group having 6 to 20 carbon atoms.

$R^1$ and $R^2$ may be bonding to each other to form a cyclic structure together with the adjacent nitrogen atom, and in this case $R^1$ and $R^2$ are forming a hydrocarbon group such that the total number of carbon atoms is 4 to 12, and the hydrocarbon group may have an unsaturated bond or a branched structure.

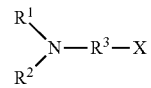
(2)

In the formula (2), $R^1$ and $R^2$ are the same as $R^1$ and $R^2$ in the formula (1), and $R^3$ is an alkylene group having 1 to 20 carbon atoms or any one of the following formulae (3) to (5).

In the case that $R^3$ is an alkylene group having 1 to 20 carbon atoms, X is any one of Cl, Br, and I; in the case that $R^3$ is any one of the following formulae (3) to (5), X is a hydrogen atom.

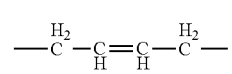
(3)

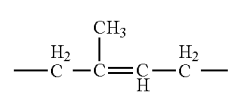
(4)

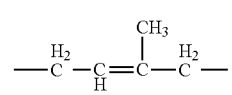
(5)

The conjugated diene polymer according to the present embodiment may be a polymer of a single conjugated diene compound or a polymer of different conjugated diene compounds, or a copolymer of a conjugated diene compound and a vinyl aromatic compound.

In a polymerization step, it is preferred to use a polymerization initiator containing a compound having at least one nitrogen atom in the molecule represented by the formula (1) or (2) and an organic lithium compound, and a conjugated diene compound or a conjugated diene compound and a vinyl aromatic compound is/are polymerized or copolymerized to obtain a conjugated diene polymer having an active end.

The polymerization initiator preferably contains an organic lithium compound having at least one nitrogen atom in the molecule, the organic lithium compound being obtained by reacting a compound having at least one nitrogen atom in the molecule and an organic lithium compound and represented by the formula (7) or (8) described later, and may contain a nitrogen-free organic lithium compound.

The organic lithium compound having at least one nitrogen atom in the molecule and represented by the formula (7) or (8) may be prepared in advance in a given reactor, or obtained by feeding a compound having at least one nitrogen atom in the molecule and an organic lithium into a reactor for polymerization or copolymerization and reacting them concomitantly with or before polymerization or copolymerization.

As a preferred mode of the conjugated diene polymer obtained in the polymerization step, the organic lithium compound and the compound having at least one nitrogen atom in the molecule are preferably added with an equimolar ratio to set the proportion of polymerized chains having a structure derived from the compound represented by the formula (1) or (2) at an molecular end to 60% by mass to 99% by mass.

The organic lithium compound is typically dissolved in a solvent and used as a solution, and some molecules of the organic lithium compound actually added lack activity because of impurities in the solvent or impurities in a monomer as a starting material. For this reason, 0.6 to 1.1 mol of the compound represented by the formula (1) or (2) is preferably added per mole of the organic lithium compound to be actually added so that the active organic lithium and the compound having nitrogen atom are equimolar.

In the method for producing the conjugated diene polymer according to the present embodiment, as described above, use of a compound represented by the formula (7) or (8) described later, which is a compound formed by reacting the compound having at least one nitrogen atom in the molecule and represented by the formula (1) or (2) and an organic lithium compound, as the polymerization initiator is preferred for reduced hysteresis loss.

Examples of the groups $R^1$ and $R^2$ in the formula (1) include, but are not limited to, methyl, ethyl, propyl, butyl, octyl, cyclopropyl, cyclohexyl, 3-phenyl-1-propyl, isobutyl, decyl, heptyl, and phenyl.

Examples of the compound represented by the formula (1) include, but are not limited to, dimethylamine, diethylamine, dibutylamine, dipropylamine, diheptylamine, dihexylamine, dioctylamine, di(2-ethylhexyl)amine, didecylamine, ethylpropylamine, ethylbutylamine, ethylbenzylamine, and methylphenethylamine, and analogs of them satisfying the conditions for the formula (1) are also included therein.

The compound represented by the formula (1) is preferably dibutylamine or dihexylamine, and more preferably dibutylamine, for reduction of the hysteresis loss of a conjugated diene polymer composition according to the present embodiment described later and reduction of the uncomfortable odor of a conjugated diene polymer according to the present embodiment.

Examples of the compound represented by the formula (1) in the case that $R^1$ and $R^2$ are bonding to each other include, but are not limited to, piperidine, hexamethyleneimine, azacyclooctane, 1,3,3-trimethyl-6-azabicyclo[3.2.1]octane, 1,2,3,6-tetrahydropyridine, and 3,5-dimethylpiperidine, and analogs of them satisfying the above conditions are also included therein.

The compound represented by the formula (1) is preferably piperidine, hexamethyleneimine, azacyclooctane, 1,3,3-trimethyl-6-azabicyclo[3.2.1]octane, or 3,5-dimethylpiperidine, and more preferably piperidine, hexamethyleneimine, or 3,5-dimethylpiperidine, for reduction of the hysteresis loss of a conjugated diene polymer composition described later and reduction of the uncomfortable odor of a conjugated diene polymer according to the present embodiment.

In the formula (2), $R^1$ and $R^2$ have the same definitions as $R^1$ and $R^2$ in the formula (1).

$R^3$ is an alkylene group having 1 to 20 carbon atoms or any one of the formulae (3) to (5).

Here, in the case that $R^3$ is an alkylene group having 1 to 20 carbon atoms, X is any one of Cl, Br, and I; in the case that $R^3$ is any one of the formulae (3) to (5), X is a hydrogen atom.

In the compound represented by the formula (2), the number of carbon atoms of $R^3$ is preferably 2 to 16, and more preferably 3 to 10, for reactivity to and interaction with an inorganic filler such as carbon black and silica.

Examples of the compound represented by the formula (2) in the case that $R^3$ is an alkylene group having 1 to 20 carbon atoms include, but are not limited to, 3-chloro-dimethylpropan-1-amine, 3-chloro-diethylpropan-1-amine, 3-chloro-dibutylpropan-1-amine, 3-chloro-dipropylpropan-1-amine, 3-chloro-diheptylpropan-1-amine, 3-chloro-dihexylpropan-1-amine, 3-chloropropyl-ethylhexan-1-amine, 3-chloro-didecylpropan-1-amine, 3-chloro-ethylpropan-1-amine, 3-chloro-ethylbutan-1-amine, 3-chloro-ethylpropan-1-amine, benzyl-3-chloro-ethylpropan-1-amine, 3-chloro-ethylphenethylpropan-1-amine, 3-chloro-methylphenethylpropan-1-amine, 1-(3-chloropropyl)piperidine, 1-(3-chloropropyl)hexamethyleneimine, 1-(3-chloropropyl)azacyclooctane, 6-(3-chloropropyl)-1,3,3-trimethyl-6-azabicyclo[3.2.1]octane, 1-(3-chloropropyl)-1,2,3,6-tetrahydropyridine, 1-(3-bromopropyl)hexamethyleneimine, 1-(3-iodopropyl)hexamethyleneimine, 1-(3-chlorobutyl)hexamethyleneimine, 1-(3-chloropentyl)hexamethyleneimine, 1-(3-chlorohexyl)hexamethyleneimine, and 1-(3-chlorodecyl)hexamethyleneimine, and analogs of them satisfying the above conditions are also included therein. The compound represented by the formula (2) is preferably 3-chloro-dibutylpropan-1-amine or 1-(3-chloropropyl)hexamethyleneimine, and more preferably 1-(3-chloropropyl)piperidine or 1-(3-chloropropyl)hexamethyleneimine, for reactivity to and interaction with an inorganic filler such as carbon black and silica.

Examples of the compound represented by the formula (2) in the case that $R^3$ is any one of the above formulae (3) to (5) include, but are not limited to, N,N-dimethyl-2-butenyl-1-amine, N,N-diethyl-2-butenyl-1-amine, N,N-dibutyl-2-butenyl-1-amine, N,N-dipropyl-2-butenyl-1-amine, N,N-diheptyl-2-butenyl-1-amine, N,N-dihexyl-2-butenyl-1-amine, N,N-dioctyl-2-butenyl-1-amine, N,N-(di-2-ethylhexyl)-2-butenyl-1-amine, N,N-didecyl-2-butenyl-1-amine, N,N-ethylpropyl-2-butenyl-1-amine, N,N-ethylfutyl-2-butenyl-1-amine, N,N-ethylbenzyl-2-butenyl-1-amine, N,N-methylphenethyl-2-butenyl-1-amine, N,N-dimethyl-2-methyl-2-butenyl-1-amine, N,N-diethyl-2-methyl-2-butenyl-1-amine, N,N-dibutyl-2-methyl-2-butenyl-1-amine, N,N-dipropyl-2-methyl-2-butenyl-1-amine, N,N-diheptyl-2-methyl-2-butenyl-1-amine, N,N-dihexyl-2-methyl-2-butenyl-1-amine, N,N-dimethyl-3-methyl-2-butenyl-1-amine, N,N-diethyl-3-methyl-2-butenyl-1-amine, N,N-dibutyl-3-methyl-2-butenyl-1-amine, N,N-dipropyl-3-methyl-2-butenyl-1-amine, N,N-diheptyl-3-methyl-2-butenyl-1-amine, N,N-dihexyl-3-methyl-2-butenyl-1-amine, 1-(2-butenyl)piperidine, 1-(2-butenyl)hexamethyleneimine, 1-(2-butenyl)azacyclooctane, 6-(2-butenyl)-1,3,3-trimethyl-6-azabicyclo[3.2.1]octane, 1-(2-butenyl)-1,2,3,6-tetrahydropyridine, (2-methyl-2-butenyl)hexamethyleneimine, and (3-methyl-2-butenyl)hexamethyleneimine, and analogs of them satisfying the above conditions are also included therein.

The compound represented by the formula (2) is preferably N,N-dibutyl-2-butenyl-1-amine or 1-(2-butenyl)hexamethyleneimine, and more preferably 1-(2-butenyl)piperidine or 1-(2-butenyl)hexamethyleneimine, for reduction of the hysteresis loss of a conjugated diene polymer composition described later.

[Organic Lithium Compound]

Examples of the organic lithium compound contained in the polymerization initiator in the polymerization step of the conjugated diene polymer according to the present embodiment include, but are not limited to, n-butyllithium, sec-butyllithium, t-butyllithium, n-propyllithium, and i-propyllithium.

The organic lithium compound of the compound represented by the formula (1) or (2) is generated through reaction by adding an organic lithium compound as a polymerization initiator in the presence of the compound represented by the formula (1) or (2).

Polymerization is initiated when the organic lithium compound of the compound represented by the formula (1) or (2) reacts with a monomer. The organic lithium compound of the compound represented by the formula (1) or (2) may be any compound capable of undergoing anionic polymerization, and a compound represented by the following formula (7) or (8) can be used.

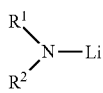
(7)

In the formula (7), $R^1$ and $R^2$ may be the same or different, and are each any one selected from the group consisting of an alkyl group having 1 to 12 carbon atoms, a cycloalkyl group having 3 to 14 carbon atoms, and an aralkyl group having 6 to 20 carbon atoms.

Examples of $R^1$ and $R^2$ include, but are not limited to, groups including methyl, ethyl, propyl, butyl, octyl, cyclopropyl, cyclohexyl, 3-phenyl-1-propyl, isobutyl, decyl, heptyl, and phenyl.

Examples of the compound represented by the formula (7) include, but are not limited to, dimethylaminolithium, diethylaminolithium, dibutylaminolithium, dipropylaminolithium, diheptylaminolithium, dihexylaminolithium, dioctylaminolithium, di-2-ethylhexylaminolithium, didecylaminolithium, ethylpropylaminolithium, ethylbutylaminolithium, ethylbenzylaminolithium, and methylphenethylaminolithium, and analogs of them satisfying the above conditions are also included therein.

The compound represented by the formula (7) is preferably dibutylaminolithium or dihexylaminolithium, for solubility in solvent and reduction of the hysteresis loss of a conjugated diene polymer composition described later. More preferred is dibutylamine.

In the formula (7), $R^1$ and $R^2$ may be bonding to each other to form a cyclic structure together with the adjacent nitrogen atom, and in this case $R^1$ and $R^2$ are forming a hydrocarbon group such that the total number of carbon atoms is 4 to 12, and the hydrocarbon group may have an unsaturated bond or a branched structure.

Examples of the compound represented by the formula (7) in the case that $R^1$ and $R^2$ are bonding to each other include, but are not limited to, piperidinolithium, hexamethyleneiminolithium, lithiumazacyclooctane, lithium-1,3,3-trimethyl-6-azabicyclo[3.2.1]octane, 1,2,3,6-tetrahydropyridinolithium, and 3,5-dimethylpiperidinolithium, and analogs of them satisfying the above conditions are also included therein.

The compound represented by the formula (7) is preferably piperidinolithium, hexamethyleneiminolithium, lithiumazacyclooctane, lithium-1,3,3-trimethyl-6-azabicyclo[3.2.1]octane, or 3,5-dimethylpiperidinolithium, and more preferably piperidinolithium, hexamethyleneiminolithium, or 3,5-dimethylpiperidinolithium, for the solubility of the polymerization initiator in solvent and reduction of the uncomfortable odor of a conjugated diene polymer described later.

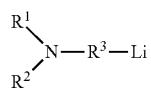
(8)

In the formula (8), $R^1$ and $R^2$ may be the same or different, and are each any one selected from the group consisting of an alkyl group having 2 to 12 carbon atoms, a cycloalkyl group having 8 to 14 carbon atoms, and an aralkyl group having 6 to 20 carbon atoms. $R^3$ is an alkylene group having 1 to 20 carbon atoms or any one of the following formulae (3) to (5).

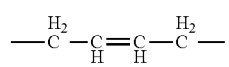
(3)

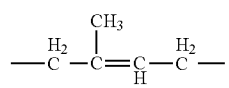
(4)

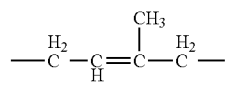
(5)

In the case that $R^3$ is an alkylene group having 1 to 20 carbon atoms in the formula (8), the number of carbon atoms of $R^3$ is preferably 2 to 16, and more preferably 3 to 10, for reactivity to and interaction with an inorganic filler such as carbon black and silica.

Examples of the compound represented by the formula (8) in the case that $R^3$ is an alkylene group having 1 to 20 carbon atoms include, but are not limited to, (3-(dimethylamino)-propyl)lithium, (3-(diethylamino)-propyl)lithium, (3-(dipropylamino)-propyl)lithium, (3-(dibutylamino)-propyl)lithium, (3-(dipentylamino)-propyl)lithium, (3-(dihexylamino)-propyl)lithium, (3-(dioctylamino)-propyl)lithium, (3-(ethylhexylamino)-propyl)lithium, (3-(didecylamino)-propyl)lithium, (3-(ethylpropylamino)-propyl)lithium, (3-(ethylbutylamino)-propyl)lithium, (3-(ethylbenzylamino)-propyl)lithium, (3-(methylphenethylamino)-propyl)lithium, (4-(dibutylamino)-butyl)lithium, (5-(dibutylamino)-pentyl)lithium, (6-(dibutylamino)-hexyl)lithium, and (10-(dibutylamino)-decyl)lithium, and analogs of them satisfying the above conditions are also included therein.

More preferred as the compound represented by the formula (8) is (3-(dibutylamino)-propyl)lithium, for reactivity to and interaction with an inorganic filler such as carbon and silica.

Examples of the compound represented by the formula (8) in the case that $R^3$ is any one of the formulae (3) to (5) include, but are not limited to, (4-(dimethylamino)-2-butenyl)lithium, (4-(diethylamino)-2-butenyl)lithium, (4-(dibutylamino)-2-butenyl)lithium, (4-(dipropylamino)-2-butenyl)lithium, (4-(diheptylamino)-2-butenyl)lithium, (4-(dihexylamino)-2-butenyl)lithium, (4-(dioctylamino)-2-butenyl)lithium, (4-(di-2-ethylhexylamino)-2-butenyl)lithium, (4-(didecylamino)-2-butenyl)lithium, (4-(ethylpropylamino)-2-butenyl)lithium, (4-(ethylbutylamino)-2-butenyl)lithium, (4-(ethylbenzylamino)-2-butenyl)lithium, (4-(methylphenethylamino)-2-butenyl)lithium, (4-(dimethylamino)-2-methyl-2-butenyl)lithium, (4-

(diethylamino)-2-methyl-2-butenyl)lithium, (4-(dibutylamino)-2-methyl-2-butenyl)lithium, (4-(dipropylamino)-2-methyl-2-butenyl)lithium, (4-(diheptylamino)-2-methyl-2-butenyl)lithium, (4-(dihexylamino)-2-methyl-2-butenyl)lithium, (4-(dimethylamino)-3-methyl-2-butenyl)lithium, (4-(diethylamino)-3-methyl-2-butenyl)lithium, (4-(dibutylamino)-3-methyl-2-butenyl)lithium, (4-(dipropylamino)-3-methyl-2-butenyl)lithium, (4-(diheptylamino)-3-methyl-2-butenyl)lithium, and (4-(dihexylamino)-3-methyl-2-butenyl)lithium, and analogs of them satisfying the above conditions are also included therein.

Preferred are (4-(dimethylamino)-2-butenyl)lithium, (4-(diethylamino)-2-butenyl)lithium, and (4-(dibutylamino)-2-butenyl)lithium, and more preferred is (4-(dibutylamino)-2-butenyl)lithium, for reactivity as a polymerization initiator.

In the formula (8), $R^1$ and $R^2$ may be bonding to each other to form a cyclic structure together with the adjacent nitrogen atom, and in this case $R^1$ and $R^2$ are forming a hydrocarbon group such that the total number of carbon atoms is 4 to 12, and the hydrocarbon group may have an unsaturated bond or a branched structure.

Examples of the compound represented by the formula (8) in the case that $R^1$ and $R^2$ are bonding to each other include, but are not limited to, (3-(piperidinyl)propyl) lithium, (3-(hexamethyleneiminyl)propyl) lithium, (3-(heptamethyleneiminyl)propyl) lithium, (3-(octamethyleneiminyl)propyl) lithium, (3-(1,3,3-trimethyl-6-azabicyclo[3.2.1]octanyl) propyl)lithium, (3-(1,2,3,6-tetrahydropyridinyl)propyl) lithium, (2-(hexamethyleneiminyl)ethyl)lithium, (4-(hexamethyleneiminyl)butyl)lithium, (5-(hexamethyleneiminyl)pentyl)lithium, (6-(hexamethyleneiminyl)hexyl)lithium, (10-(hexamethyleneiminyl)decyl)lithium, (4-(piperidinyl)-2-butenyl) lithium, (4-(hexamethyleneiminyl)-2-butenyl) lithium, (4-(heptamethyleneiminyl)-2-butenyl)lithium, (4-(octamethyleneiminyl)-2-butenyl)lithium, (4-(1,3,3-trimethyl-6-azabicyclo[3.2.1]octanyl)-2-butenyl)lithium, (4-(1,2,3,6-tetrahydropyridinyl)-2-butenyl)lithium, (4-(hexamethyleneiminyl)-2-methyl-2-butenyl)lithium, and (4-(hexamethyleneiminyl)-3-methyl-2-butenyl)lithium, and analogs of them satisfying the above conditions are also included therein.

The compound represented by the formula (8) is preferably (3-(piperidinyl)propyl)lithium, (3-(hexamethyleneiminyl)propyl)lithium, (3-(1,2,3,6-tetrahydropyridinyl)propyl) lithium, (4-(piperidinyl)-2-butenyl) lithium, or (4-(hexamethyleneiminyl)-2-butenyl)lithium, and more preferably (3-(piperidinyl)propyl) lithium, (4-(piperidinyl)-2-butenyl)lithium, (3-(hexamethyleneiminyl)propyl) lithium, or (4-(hexamethyleneiminyl)-2-butenyl)lithium, for reactivity to and interaction with an inorganic filler such as carbon black and silica.

The organic lithium compound having at least one nitrogen atom in the molecule represented by the formula (7) or (8) may be prepared in advance before the above-described polymerization step, and conventionally known preparation methods can be applied.

The organic lithium compound represented by the formula (8) in the case that $R^3$ is an alkylene group having 1 to 20 carbon atoms can be obtained, for example, in a manner such that the amine represented by the formula (1) and an organic lithium compound are reacted together in a hydrocarbon solvent to prepare a lithium amide compound, with which a dihalogenated alkyl represented by the following formula (9) is reacted and an organic lithium compound is further reacted.

$$X^1-R^{3a}-X^2 \qquad (9)$$

In the formula (9), $X^1$ and $X^2$ are each any one of halogen atoms selected from the group consisting of I, Br, and Cl, and different from each other.

By taking advantage of difference in reactivity provided by the configuration such that $X^1$ and $X^2$ are different halogen atoms, halogen with the higher reactivity is first reacted with a lithium amide compound, and subsequently the other halogen is reacted with an organic lithium compound to afford a compound as illustrated in the formula (8). In the formula (9), $R^{3a}$ is an alkylene group having 1 to 20 carbon atoms, preferably an alkylene group having 2 to 16 carbon atoms, and more preferably an alkylene group having 3 to 10 carbon atoms.

Examples of the compound represented by the formula (9) include, but are not limited to, 1-bromo-3-chloropropane, 1-bromo-4-chlorobutane, 1-bromo-5-chloropentane, 1-bromo-6-chlorohexane, 1-bromo-10-chlorodecane, 1-bromo-3-iodopropane, 1-bromo-4-iodobutane, 1-bromo-5-iodopentane, 1-bromo-6-iodohexane, 1-bromo-10-iododecane, 1-chloro-3-iodopropane, 1-chloro-4-iodobutane, 1-chloro-5-iodopentane, 1-chloro-6-iodohexane, and 1-chloro-10-iododecane.

Preferred as the compound represented by the formula (9) are 1-bromo-3-chloropropane, 1-bromo-4-chlorobutane, 1-bromo-5-chloropentane, 1-bromo-6-chlorohexane, and 1-bromo-10-chlorodecane, and more preferred are 1-bromo-3-chloropropane, 1-bromo-4-chlorobutane, and 1-bromo-6-chlorohexane, for reactivity and safety.

The reaction temperature in preparing a lithium amide compound by using the formula (1), an organic lithium compound, and a hydrocarbon solvent is preferably 0 to 80° C., and the reaction temperature is preferably 10 to 70° C. for productivity.

The reaction temperature in reacting the lithium amide compound and the compound represented by the formula (9) is preferably −78 to 70° C., and more preferably −50 to 50° C. The reaction temperature in the subsequent reaction between the compound obtained and an organic lithium compound is preferably −78 to 70° C., and more preferably −50 to 50° C.

In the case that $R^3$ of the organic lithium compound having at least one nitrogen atom in the molecule and represented by the formula (8) is any one of the formulae (3) to (5), the organic lithium compound of the formula (8) can be synthesized by using the following steps (I) to (IV).

Step (I): reacting the compound represented by the formula (1) and an organic lithium compound in a hydrocarbon solvent to synthesize a lithium amide compound.

Step (II): reacting the lithium amide compound obtained and butadiene or isoprene in a hydrocarbon solvent.

Step (III): adding an alcohol to deactivate lithium and subjecting the resulting product to distillation under reduced pressure.

Step (IV): reacting the product obtained through the distillation and an organic lithium compound in a hydrocarbon solvent.

The reaction temperature in the step (I) of preparing a lithium amide compound by using the compound represented by the formula (1), an organic lithium compound, and a hydrocarbon solvent is preferably 0 to 80° C., and, the reaction temperature is preferably 10 to 70° C. for productivity.

Although known materials of alcohol can be used, alcohols of low molecular weight are preferred, and, for example, methanol, ethanol, and isopropanol are preferred, and ethanol is more preferred.

The reaction temperature in the step (IV) is preferably 0 to 80° C., and more preferably 10 to 70° C.

In preparing the organic lithium compound represented by the formula (7) or (8), a polar compound may be added to the system. This provides effects of accelerating formation of the lithium compound represented by the formula (7) or (8) and solubilizing in hydrocarbon solvent.

For the polar compound, those described in the following can be used, and tetrahydrofuran is particularly preferred.

<Polar Compound>

A polar compound may be added in the polymerization reaction step to form a conjugated diene polymer by polymerization in the method for producing the conjugated diene polymer according to the present embodiment.

Addition of a polar compound allows the vinyl aromatic monomer and the conjugated diene monomer to randomly copolymerize, and hence a polar compound can be used as a vinylating agent to control the microstructure of a conjugated diene part.

In addition, addition of a polar compound is effective, for example, for improving the polymerization rate.

Examples of the polar compound include, but are not limited to, ethers such as tetrahydrofuran, diethyl ether, dioxane, ethylene glycoldimethyl ether, ethylene glycoldibutyl ether, diethylene glycoldimethyl ether, diethylene glycoldibutyl ether, dimethoxybenzene, and 2,2-bis(2-oxolanyl)propane; tertiary amine compounds such as tetramethylethylenediamine, dipiperidinoethane, trimethylamine, triethylamine, pyridine, and quinuclidine; alkali metal alkoxide compounds such as potassium t-amylate, potassium t-butyrate, sodium t-butyrate, and sodium amylate; and phosphine compounds such as triphenylphosphine.

One of these polar compounds may be used singly, and two or more thereof may be used in combination.

Use of two or more polar compounds, specifically, use of tetrahydrofuran and other polar compounds is preferred because a sharper molecular weight distribution can be achieved.

The amount of use of the polar compound is not limited, and can be selected, for example, in accordance with the purpose.

In typical cases, the amount of use of the polar compound is preferably 0.01 to 100 mol per mole of the above-described polymerization initiator.

The polar compound (vinylating agent) can be used as a regulator for the microstructure of a conjugated diene moiety in the polymer in an appropriate amount depending on a vinyl bond content intended.

Many polar compounds simultaneously exhibit randomizing effect effective in copolymerization of the conjugated diene monomer and the vinyl aromatic monomer, and hence can be used for adjusting the distribution of the vinyl aromatic monomer or as an adjuster for the styrene block content.

For example, a method of intermittently adding part of 1,3-butadiene during copolymerization, as described in Japanese Patent Laid-Open No. 59-140211, may be used to randomize the conjugated diene monomer and the vinyl aromatic monomer.

If a polymerization initiator formed by reacting a compound having a modifying group, which is a compound having at least one nitrogen atom in the molecule, is used, a copolymer the polymerization-starting end of which is modified is obtained, as described above. The conjugated diene polymer obtained in the polymerization step preferably has been modified at the polymerization-starting end, and it is preferred in such a case to set the proportion of polymerized chains having the structure derived from the compound represented by the formula (1) or (2) at a molecular end in the conjugated diene polymer obtained to 60% by mass to 99% by mass. In this case, the amount of the compound having at least one nitrogen atom in the molecule to be added is preferably 0.6 mole to 1.1 mole per mole of the organic lithium compound.

In addition to the regulation of the loading ratio, the solution temperature at initiation of polymerization and the reaction peak temperature are preferably adjusted to set the proportion of polymerized chains having the structure derived from the compound represented by the formula (1) or (2) at a molecular end in the conjugated diene polymer to 60% by mass to 99% by mass.

The solution temperature at initiation of polymerization (hereinafter, also referred to as "polymerization initiation temperature") is preferably 10° C. or higher. To obtain a conjugated diene polymer in which the proportion of polymerized chains having the structure derived from the compound represented by the formula (1) or (2) at a molecular end is 60% by mass to 99% by mass, the solution temperature at initiation of polymerization is preferably 49° C. or lower, and more preferably 45° C. or lower.

The solution temperature at initiation of polymerization is more preferably 15° C. or higher, and even more preferably 20° C. or higher.

When the organic lithium compound represented by the formula (7) or (8) is reacted as a polymerization initiator, the reaction peak temperature is preferably 68° C. or higher from the viewpoints of the conversion rate of monomers and reaction time. Further, the reaction peak temperature is preferably 90° C. or lower to attain a coupling rate of 70% to 95% by reacting a coupling agent described later. The reaction peak temperature is preferably 70° C. or higher, and more preferably 72° C. or higher. The reaction peak temperature is preferably 85° C. or lower, and more preferably 80° C. or lower.

By setting the polymerization initiation temperature preferably to 20 to 45° C. and setting the reaction peak temperature preferably to 72 to 80° C., a conjugated diene polymer can be obtained in which the proportion of polymerized chains having the structure derived from the compound represented by the formula (1) or (2) at a molecular end is 60 to 99% by mass.

By setting the polymerization initiation temperature to 20 to 41° C. and setting the reaction peak temperature to 73 to 80° C., a conjugated diene polymer can be obtained in which the proportion of polymerized chains having the structure derived from the compound represented by the formula (1) or (2) at a molecular end is 80% to 98% by mass.

<Coupling Agent>

The conjugated diene polymer according to the present embodiment is preferably converted into a modified conjugated diene polymer by reacting with a specific coupling agent.

It is preferred for reactivity between the functional group of a coupling agent and an inorganic filler such as silica and balance between low hysteresis loss and wet skid resistance in a vulcanized product to react an active end of the conjugated diene polymer with a compound represented by the following formula (6) to obtain a modified conjugated diene polymer.

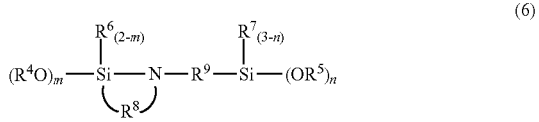

(6)

In the formula (6), $R^4$ to $R^7$ each independently represent an alkyl group having 1 to 20 carbon atoms or an aryl group having 6 to 20 carbon atoms; $R^8$ represents an alkylene group having 3 to 10 carbon atoms; $R^9$ represents an alkylene group having 1 to 20 carbon atoms; m is an integer of 1 or 2; and n is an integer of 2 or 3.

In the compound represented by the formula (6) (hereinafter, also referred to as "the coupling agent represented by the formula (6)"), it is preferable that m be 2 and n be 3.

This provides increased reactivity between the functional group of the coupling agent and an inorganic filler such as silica and enhanced balance between fuel-saving performance and wet skid performance in a vulcanized product, and enhanced processability can be achieved.

Examples of the coupling agent represented by the formula (6) include, but are not limited to, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(5-trimethoxysilylpentyl)-1-aza-2-silacycloheptane, 2,2-dimethoxy-1-(3-dimethoxymethylsilylpropyl)-1-aza-2-silacyclopentane, 2,2-diethoxy-1-(3-diethoxyethylsilylpropyl)-1-aza-2-silacyclopentane, 2-methoxy-2-methyl-1-(3-trimethoxysilylpropyl)-1-aza-2-silacyclopentane, 2-ethoxy-2-ethyl-1-(3-triethoxysilylpropyl)-1-aza-2-silacyclopentane, 2-methoxy-2-methyl-1-(3-dimethoxymethylsilylpropyl)-1-aza-2-silacyclopentane, and 2-ethoxy-2-ethyl-1-(3-diethoxyethylsilylpropyl)-1-aza-2-silacyclopentane.

As described above, it is preferable for reactivity to and interaction between the functional group of the coupling agent and an inorganic filler such as silica and for processability that m be 2 and n be 3 in the formula (6); specifically, 2,2-dimethoxy-1-(3-trimethoxysilylpropyl)-1-aza-2-silacyclopentane and 2,2-diethoxy-1-(3-triethoxysilylpropyl)-1-aza-2-silacyclopentane are preferred as the compound represented by the formula (6).

The coupling rate of the conjugated diene polymer with the coupling agent represented by the formula (6) is preferably 70 to 95% by mass for reactivity to and interaction between the functional group of the coupling agent and an inorganic filler such as silica and for processability.

The lower limit of the coupling rate is preferably 75% by mass or higher, and more preferably 80% by mass or higher.

The upper limit of the coupling rate is preferably 95% by mass or lower, and more preferably 90% by mass or lower.

The coupling rate can be controlled within the range through adjusting the reaction peak temperature before addition of the coupling agent represented by the formula (6) in the polymerization step.

Although the reaction temperature, reaction time, and so forth in reacting the coupling agent and an active end of the conjugated diene polymer are not limited, it is preferred to react at 68 to 90° C. for 30 seconds or longer.

In order to attain a sufficient coupling rate in modification reaction between the coupling agent represented by the formula (6) and the conjugated diene polymer, the total number of moles of alkoxy groups bonding to a silyl group in the compound represented by the formula (6) is preferably 0.6 times or more the number of moles of lithium constituting the above-described polymerization initiator, and preferably 3 times or less the number of moles of lithium constituting the above-described polymerization initiator, from the viewpoint of the cost of the modifier, in addition to the viewpoint that it is preferred to obtain a branched polymer component through coupling of polymer ends for improved processability.

The total number of moles is more preferably in the range of 0.8 to 2.5 times, even more preferably, 0.8 to 2 times the number of moles of lithium constituting the above-described polymerization initiator.

It is only required for the coupling step that a modified conjugated diene polymer desired is obtained through reaction between an active end of the conjugated diene copolymer obtained in the polymerization step and the coupling agent represented by the formula (6), where the action is inferred as follows.

In the case that an azasilane compound, which has a cyclic structure, such as 2,2-dimethoxy-1-(3-trimethoxysilylpropyl)-1-aza-2-silacyclopentane is used as a coupling agent, for example, an active end of the conjugated diene polymer reacts with an alkoxysilyl group or an Si—N bonding portion of the coupling agent to form a bond between an end of the conjugated diene polymer and Si (see the formula (10) below).

In the case that 4 mol of active ends of the conjugated diene polymer react per mole of the coupling agent, for example, a conjugated diene polymer in which four molecular chains are coupled as illustrated in the formula (10) below is obtained.

Further, reaction with an alcohol or water forms a secondary amino group. The conjugated diene polymer having such a secondary amino group and alkoxysilyl groups is inferred to impart superior balance between low hysteresis loss and wet skid resistance and abrasion resistance enough for practical use to a vulcanized product formed by using the conjugated diene polymer, and allow the vulcanized product to exhibit superior processability.

The mechanism of action in the coupling step is not limited to the described example.

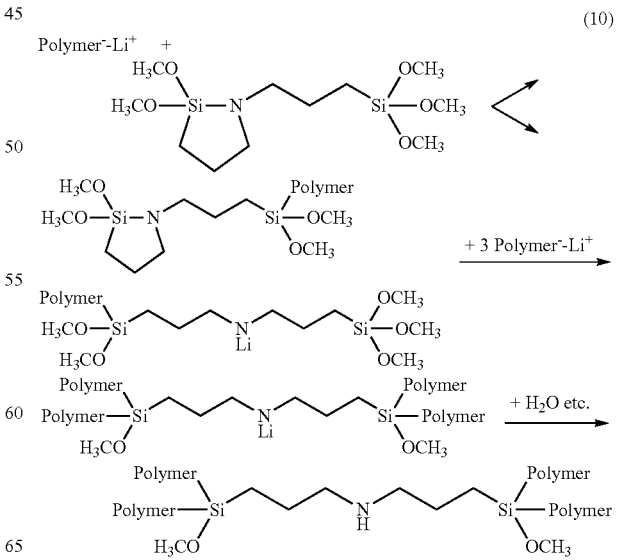

(10)

The conjugated diene polymer obtained in the above-described coupling step has a nitrogen atom-containing functional group at a polymerization-starting end, and a vulcanized product formed by using the conjugated diene polymer is superior in balance between fuel-saving performance and wet skid resistance, and superior in abrasion resistance and processability.

If the conjugated diene polymer obtained in the above-described coupling step has one secondary amino group and at least one alkoxysilyl group, the conjugated diene polymer can impart superior balance between low hysteresis loss and wet skid resistance and abrasion resistance enough for practical use to a vulcanized product formed by using the conjugated diene polymer, and allows the vulcanized product to exhibit superior processability.

In the method for producing the conjugated diene polymer according to the present embodiment, the coupling agent is not limited to those described above, and a compound having a structure differing from those of the above coupling agents may be used as a coupling agent.

Coupling agents having an amino group are preferred for balance between low hysteresis loss and wet skid resistance in a vulcanized product.

Examples of such coupling agents include, but are not limited to, 3-(4-methylpiperazin-1-yl)propyltriethoxysilane, 1-[3-(diethoxyethylsilyl)propyl]-4-methylpiperazine, 1-[3-(trimethoxysilyl)propyl]-3-methylimidazolidine, 1-[3-(diethoxysilyl)propyl]-3-ethylimidazolidine, 1-[3-(triethoxysilyl)propyl]-3-methylhexahydropyrimidine, 1-[3-(dimethoxymethylsilyl)propyl]-3-methylhexahydropyrimidine, 3-[3-(tributoxysilyl)propyl]-1-methyl-1,2,3,4-tetrahydropyrimidine, 3-[3-(dimethoxymethylsilyl)propyl]-1-ethyl-1,2,3,4-tetrahydropyrimidine, 1-(2-ethoxyethyl)-3-[3-(trimethoxysilyl)propyl]imidazolidine, (2-{3-[3-(trimethylsilyl)propyl]tetrahydropyrimidine-yl}ethyl) dimethylamine, 1-[3-(triethoxysilyl)propyl]-4-(trimethylsilyl)piperazine, 1-[3-(dimethoxymethylsilyl)propyl]-4-(trimethylsilyl)piperazine, 1-[3-(tributoxysilyl)propyl]-4-(trimethylsilyl)piperazine, 1-[3-(diethoxyethylsilyl)propyl]-3-(triethylsilyl)imidazolidine, 2-(trimethoxysilanyl)-1,3-dimethylimidazolidine, 1-[3-(triethoxysilyl)propyl]-3-(trimethylsilyl)imidazolidine, 1-[3-(dimethoxymethylsilyl)propyl]-3-(trimethylsilyl) hexahydropyrimidine, 1-[3-(triethoxysilyl)propyl]-3-(trimethylsilyl)hexahydropyrimidine, and 1-[4-(triethoxysilyl)propyl]-4-(trimethylsilyl)piperazine.

Further examples include, but are not limited to, 2-[3-(trimethoxysilyl)propyl]-1,3-dimethylimidazolidine, 2-[3-(trimethoxysilyl)propyl]-1,3-(bistrimethylsilyl)imidazolidine, 2-(diethoxydiethylsilyl)-1,3-diethylimidazolidine, 2-(triethoxysilyl)-1,4-diethylpiperazine, 2-(dimethoxymethylsilyl)-1,4-dimethylpiperazine, 5-(triethoxysilyl)-1,3-dipropylhexahydropyrimidine, 5-(diethoxyethylsilyl)-1,3-diethylhexahydropyrimidine, {2-[3-(2-dimethylaminoethyl)-2-(ethyldimethoxysilyl)-imidazolidine-1-yl]-ethyl}-dimethylamine, 5-(trimethoxysilyl)-1,3-bis-(2-methoxyethyl)-hexahydropyrimidine, 5-(ethyldimethoxysilyl)-1,3-bis-(2-trimethylsilyl-ethyl)-hexahydropyrimidinyl-1,3-dimethylimidazolidine, 2-(3-diethoxyethylsilyl-propyl)-1,3-diethylimidazolidine, 2-(3-triethoxysilyl-propyl)-1,4-diethylpiperazine, 2-(3-dimethoxymethylsilyl-propyl)-1,4-dimethylpiperazine, 5-(3-triethoxysilyl-propyl)-1,3-dipropylhexahydropyrimidine, 5-(3-diethoxyethylsilyl-propyl)-1,3-diethylhexahydropyrimidine, {2-[3-(2-dimethylaminoethyl)-2-(3-ethyldimethoxysilyl-propyl)-imidazolidine-1-yl]-ethyl}-dimethylamine, 5-(3-trimethoxysilyl-propyl)-1,3-bis-(2-methoxyethyl)-hexahydropyrimidine, 5-(3-ethyldimethoxysilyl-propyl)-1,3-bis-(2-trimethylsilylethyl)-hexahydropyrimidine, 2-[3-(trimethoxysilyl)propyl]-1,3-bis(trimethylsilyl) imidazolidine, 2-(diethoxyethylsilyl)-1,3-bis(triethylsilyl) imidazolidine, 2-(triethoxysilyl)-1,4-bis(trimethylsilyl) piperazine, 2-(dimethoxymethylsilyl)-1,4-bis (trimethylsilyl)piperazine, and 5-(triethoxysilyl)-1,3-bis (tripropylsilyl)hexahydropyrimidine.

Further examples include, but are not limited to, [3-(1-hexamethyleneimino)propyl]triethoxysilane, [3-(1-hexamethyleneimino)propyl]trimethoxysilane, [2-(1-hexamethyleneimino)ethyl]triethoxysilane, [2-(1-hexamethyleneimino)ethyl]trimethoxysilane, [3-(1-pyrrolidinyl)propyl] triethoxysilane, [3-(1-pyrrolidinyl)propyl]trimethoxysilane, [3-(1-heptamethyleneimino)propyl]triethoxysilane, [3-(1-dodecamethyleneimino)propyl]triethoxysilane, [3-(1-hexamethyleneimino)propyl]diethoxymethylsilane, [3-(1-hexamethyleneimino)propyl]diethoxyethylsilane, N-[3-(triethoxysilyl)-propyl]-N,N'-diethyl-N'-trimethylsilyl-ethan-1,2-diamine, N-[2-(trimethoxysilanyl)-ethyl]-N,N', N'-trimethylethane-1,2-diamine, and N,N-bis(trimethylsilyl) aminopropylmethyldiethoxysilane.

Further examples include tetraglycidyl meta-xylenediamine, tetraglycidyl aminodiphenylmethane, tetraglycidyl-p-phenylenediamine, diglycidyl aminomethylcyclohexane, and tetraglycidyl-1,3-bisaminomethylcyclohexane. Further examples include, but are not limited to, isocyanate compounds such as 2,4-tolylene diisocyanate, 2,6-tolylene diisocyanate, diphenylmethane diisocyanate, diphenylethane diisocyanate, and 1,3,5-benzene triisocyanate.

<Other Coupling Agents>

The conjugated diene polymer according to the present embodiment is not limited to a conjugated diene polymer modified with any of the coupling agents described above, and may be that modified with a coupling agent having a modifying group of another type.

Examples of the modifying group of another type include, but are not limited to, an epoxy group, a carbonyl group, a carboxylate group, a carboxylic acid amide group, an acid anhydride group, a phosphate group, a phosphite group, an epithio group, a thiocarbonyl group, a thiocarboxylate group, a dithiocarboxylate group, a thiocarboxylic acid amide group, an imino group, an ethyleneimino group, a halogen group, an alkoxysilyl group, an isocyanate group, a thioisocyanate group, a conjugated diene group, and an arylvinyl group, and examples of the coupling agent having a modifying group of another type include coupling agents having one or more functional groups selected from the listed groups.

Examples of such other coupling agents include, but are not limited to, halogenated silane compounds such as silicon tetrachloride, silicon tetrabromide, silicon tetraiodide, monomethyltrichlorosilicon, monoethyltrichlorosilicon, monobutyltrichlorosilicon, monohexyltrichlorosilicon, monomethyltribromosilicon, and bistrichlorosilylethane; and alkoxy halogenated silane compounds such as monochlorotrimethoxysilane, monobromotrimethoxysilane, dichlorodimethoxysilane, dibromodimethoxysilane, trichloromethoxysilane, and tribromomethoxysilane.

Further examples include, but are not limited to, alkoxysilane compounds such as tetramethoxysilane, tetraethoxysilane, tetrabutoxysilane, and alkyltriphenoxysilane; and compounds having an imino group and an alkoxysilyl group such as tristrimethoxysilylpropylamine, triethoxysilylpropylamine, N-(1,3-dimethylbutylidene)-3-(triethoxysilyl)-1-propaneamine, N-(1,3-dimethylbutylidene)-3-(tributoxysilyl)-1-propaneamine, N-(1-methylpropylidene)-3-(triethoxysilyl)-1-propaneamine, N-ethylidene-3-(triethoxysilyl)-1-propaneamine, and N-(3-triethoxysilylpropyl)-4,5-dihydroimidazole.

Further, if the conjugated diene polymer obtained in the above-described coupling step has a structure including one to six branches, this conjugated diene polymer and the corresponding conjugated diene polymer composition have superior processability. For this reason, it is more preferable for the conjugated diene polymer obtained in the coupling step to have a structure including one to six branches.

The coupling rate of the conjugated diene polymer according to the present embodiment can be determined from the amount of adsorption on a column packed with silica particles in measurement with gel permeation chromatography (GPC). That is, the coupling rate (modification rate) is the fraction of polymer having a functional group component.

The coupling rate is measured after an active end has been deactivated after the coupling step.

To quantify polymer having a functional group component, a method of measuring with gel permeation chromatography capable of separating modified components having a functional group from unmodified components can be applied. Examples of methods with such gel permeation chromatography include a method of quantification by using a GPC column including a packing material of a polar substance such as silica to adsorb functional group components thereon with an internal standard of a nonadsorbable component for comparison.

The proportion of modified polymer chains in the conjugated diene polymer is preferably 30% to 99%, more preferably 70% to 99%, even more preferably 80% to 99%, and further preferably 85% to 99%.

The proportion of modified polymer chains is the proportion of polymer chains having a modified component having a functional group in the conjugated diene polymer.

After the polymerization step, in which an organic lithium compound as a polymerization initiator is added to a conjugated diene monomer in the presence of the compound represented by the formula (1) or (2) to polymerize the conjugated diene monomer, or after the step of further reacting with the above-described coupling agent (hereinafter, also referred to as "modification step") in the method for producing the conjugated diene polymer according to the present embodiment, a deactivating agent, a neutralizing agent, or the like may be added to the solution of the conjugated diene polymer, as necessary.

Examples of the deactivating agent include, but are not limited to, water and alcohol such as methanol, ethanol, and isopropanol.

Examples of the neutralizing agent include, but are not limited to, carboxylic acid such as stearic acid, oleic acid, and versatic acid; aqueous solution of inorganic acid; and carbon dioxide gas.

After the above-described coupling step, the polymer solution is desolvated to obtain a conjugated diene polymer.

Known methods can be used to obtain the conjugated diene polymer according to the present embodiment from the polymer solution.

Examples of the method include a method in which the solvent is separated through steam stripping or the like, and the conjugated diene polymer is then collected through filtration, and further dehydrated and dried to obtain the conjugated diene polymer, a method of concentrating with a flushing tank and further devolatilizing with a vent extruder or the like, and a method of directly devolatilizing with a drum dryer or the like.

Examples of methods for producing the conjugated diene polymer according to the present embodiment so that the conjugated diene polymer according to the present embodiment has two or more peaks in a molecular distribution curve obtained by measurement with GPC include, but are not limited to, (Production Method 1) a method of blending together two or more conjugated diene polymers each having a glass transition temperature and molecular weight in specific ranges, and (Production Method 2) a method in which a conjugated diene polymer having a glass transition temperature of Tg (B) (the glass transition temperature of the conjugated diene polymer in the peak (B) having a peak molecular weight of 150,000 to 600,000) is polymerized, 0.2 to 0.8 mol of a reaction terminator or coupling agent is then added to active ends, and then a vinyl aromatic compound and a conjugated diene compound are additionally added to polymerize a segment having a glass transition temperature of Tg (A) (the glass transition temperature of the conjugated diene polymer in the peak (A) having a peak molecular weight of 500,000 to 2,500,000).

The peak molecular weight of each peak can be controlled, for example, through the loading of the polymerization initiator or the number of functional groups of each modifier.

The area percentage of each peak can be controlled, for example, through the type, loading, or blend ratio of a modifier, and the loading of each monomer additionally added, though the method is not limited thereto.

The nitrogen content can be controlled, for example, through the type or loading of the polymerization initiator, or the type or loading of each modifier.

In the case that the above-described method of (Production method 1) is performed in the present embodiment, a method of blending a high-molecular-weight conjugated diene polymer and a low-molecular-weight conjugated diene polymer together is preferably used, and the high-molecular-weight conjugated diene polymer and low-molecular-weight conjugated diene polymer preferably satisfy the following.

[High-Molecular-Weight Conjugated Diene Polymer]

The high-molecular-weight conjugated diene polymer is a homopolymer primarily of a conjugated diene compound, or a copolymer with a vinyl aromatic compound.

The proportion of the conjugated diene compound in the high-molecular-weight conjugated diene polymer is preferably 30% by mass or more, and the content of the vinyl aromatic compound is preferably 10 to 60% by mass, more preferably 11 to 58% by mass, even more preferably 11 to 55% by mass, and further preferably 10 to 50% by mass, for balancing low hysteresis loss and wet skid properties.

The weight-average molecular weight of the high-molecular-weight conjugated diene polymer in GPC in terms of polystyrene is preferably 450,000 to 1,500,000, and more preferably 450,000 to 1,200,000. For abrasion resistance, the peak molecular weight in GPC in terms of polystyrene is 500,000 to 2,500,000, preferably 500,000 to 2,000,000, more preferably 500,000 to 1,800,000, and even more preferably 500,000 to 1,500,000.

For balancing processability and abrasion resistance, the area of the peak with peak molecular weight of 500,000 to 2,500,000 is preferably 20% to 80%, more preferably 30% to 80%, and even more preferably 35% to 75%, as the area of a molecular weight distribution curve obtained for the high-molecular-weight conjugated diene polymer in GPC is defined as 100%.

The glass transition temperature of the high-molecular-weight conjugated diene polymer is preferably −70° C. to −15° C., and more preferably −65° C. to −18° C.

The high-molecular-weight conjugated diene polymer may be modified or unmodified. However, the high-molecular-weight conjugated diene polymer is preferably modified for low hysteresis loss, and the fraction of a conjugated diene polymer having a nitrogen atom is preferably 60% by mass to 99% by mass. The nitrogen content is preferably 0 ppm to 200 ppm.

[Low-molecular-weight conjugated diene polymer]

The low-molecular-weight conjugated diene polymer in the present embodiment is a copolymer of a conjugated diene compound and a vinyl aromatic compound, and the fraction of the conjugated diene compound in the low-molecular-weight conjugated diene polymer is preferably 30% by mass or more, and the content of the vinyl aromatic compound is preferably 10 to 60% by mass, more preferably 12 to 59% by mass, even more preferably 12 to 56% by mass, and further preferably 10 to 50% by mass, for balancing low hysteresis loss and wet skid properties.

The weight-average molecular weight of the low-molecular-weight conjugated diene polymer in GPC in terms of polystyrene is preferably 120,000 to 400,000, and more preferably 150,000 to 380,000.

For processability, the low-molecular-weight conjugated diene polymer has a peak with peak molecular weight of 150,000 to 600,000 in GPC in terms of polystyrene, preferably has a peak with peak molecular weight of 150,000 to 400,000, more preferably has a peak with peak molecular weight of 150,000 to 380,000, and even more preferably has a peak with peak molecular weight of 150,000 to 350,000.

For improved balance between processability and abrasion resistance, the area of the peak with peak molecular weight of 150,000 to 600,000 is preferably 20% to 80%, more preferably 30% to 80%, and even more preferably 35 to 75%, as the area of a molecular weight distribution curve obtained for the low-molecular-weight conjugated diene polymer in GPC is defined as 100%.

The glass transition temperature of the low-molecular-weight conjugated diene polymer is preferably −68° C. to −13° C., and more preferably −63° C. to −16° C.

The glass transition temperature of the low-molecular-weight conjugated diene polymer is higher than the glass transition temperature of the high-molecular-weight conjugated diene polymer preferably by 2° C. to 30° C., more preferably by 2° C. to 25° C., even more preferably by 2° C. to 20° C., particularly preferably by 2° C. to 18° C.

To control the glass transition temperature of the low-molecular-weight conjugated diene polymer to be higher than the glass transition temperature of the high-molecular-weight conjugated diene polymer, the loading of the vinyl aromatic compound in polymerization is increased to raise the content of the vinyl aromatic compound in the conjugated diene polymer, or the loading of the vinylating agent in polymerization is increased to raise the 1,2-vinyl bond content.

For abrasion resistance and low hysteresis loss, the fraction of modified polymer chains in the low-molecular-weight conjugated diene polymer is preferably 60% to 99%, more preferably 65% to 99%, and even more preferably 70% to 99%. The nitrogen content is preferably 120 ppm to 800 ppm.

In the case that the conjugated diene polymer according to the present embodiment is produced by mixing the high-molecular-weight conjugated diene polymer and the low-molecular-weight conjugated diene polymer together, the mixing method may be any method capable of homogeneously mixing; however, mixing in the state of solution is preferred.

For balances between low hysteresis loss and wet skid properties and between abrasion resistance and processability, the blend ratio is in the range of (high-molecular-weight conjugated diene polymer):(low-molecular-weight conjugated diene polymer)=15:85 to 85:15 in a mass ratio, preferably 20:80 to 80:20, and even more preferably 30:70 to 70:30.

In a desolvation step in producing the conjugated diene polymer according to the present embodiment, known methods with a desolvating agent can be used.

Examples of the method include a method in which the solvent is separated through steam stripping or the like, and the conjugated diene polymer is then collected through filtration, and further dehydrated and dried to obtain the conjugated diene polymer, a method of concentrating with a flushing tank and further devolatilizing with a vent extruder or the like, and a method of directly devolatilizing with a drum dryer or the like.

Mixing of the high-molecular-weight conjugated diene polymer and the low-molecular-weight conjugated diene polymer together in the production process for the conjugated diene polymer according to the present embodiment is not limited to the above-described method, and, for example, solids of the high-molecular-weight conjugated diene polymer and the low-molecular-weight conjugated diene polymer may be mixed together, and a polymer solution of one of the polymers and a solid of the other may be mixed together.

An additive such as a rubber stabilizer may be added to the conjugated diene polymer according to the present embodiment.

For preventing gel formation after polymerization and for enhanced stability in processing, a rubber stabilizer is preferably added to the conjugated diene polymer according to the present embodiment.

Known rubber stabilizers can be used, and antioxidants such as 2,6-di-tert-butyl-4-hydroxytoluene (BHT), n-octadecyl-3-(4'-hydroxy-3'5'-di-tert-butylphenol)propionate, and 2-methyl-4,6-bis[(octylthio)methyl]phenol are preferred, though the rubber stabilizer is not limited thereto.

In order to further improve the processability of the conjugated diene polymer according to the present embodiment, an extender oil can be added to the conjugated diene copolymer, as necessary.

The method of adding an extender oil to the conjugated diene polymer is not limited, and a method is preferred in which an extender oil is added to the polymer solution and mixed to form an oil-extended copolymer solution, which is desolvated.

Examples of the extender oil include, but are not limited to, aromatic oil, naphthenic oil, and paraffinic oil. Especially, aromatic oil substitutes having 3% by mass or less of polycyclic aromatic (PCA) components as measured in the IP346 method are preferred for environmental safety, preventing oil bleeding, and wet grip properties.

Examples of such aromatic oil substitutes include TDAE (Treated Distillate Aromatic Extracts) and MES (Mild Extraction Solvate) shown in kautschuk Gumml Kunststoffe 52(12) 799 (1999), and RAE (Residual Aromatic Extracts).

The loading of the extender oil is not limited, and typically 10 to 60 parts by mass, and preferably 20 to 37.5 parts by mass, based on 100 parts by mass of the conjugated diene polymer.

[Conjugated Diene Polymer Composition]

The conjugated diene polymer composition according to the present embodiment contains a rubber composition containing the above-described conjugated diene polymer according to the present embodiment and, as necessary, a specific additional rubber component; and a reinforcing filler, a vulcanizing agent, and a vulcanization accelerator.

Examples of the reinforcing filler include silica-based inorganic fillers.

A suitable example of the conjugated diene polymer composition according to the present embodiment is a conjugated diene polymer composition containing: 100 parts by mass of a rubber component containing 20 parts by mass or more of the conjugated diene polymer according to the present embodiment; 1 part by mass to 150 parts by mass of a reinforcing filler; and 0.1 parts by mass to 20 parts by mass in total of a vulcanizing agent and a vulcanization accelerator.

(Rubber Component)

The conjugated diene polymer composition may contain a rubbery polymer differing from the conjugated diene polymer according to the present embodiment as the rubber component.

Examples of the rubbery polymer differing from the conjugated diene polymer according to the present embodiment include, but are not limited to, conjugated diene polymer or hydrogenated products thereof; random copolymer of a conjugated diene-based compound and a vinyl aromatic compound, or hydrogenated products thereof; block copolymer of a conjugated diene-based compound and a vinyl aromatic compound, or hydrogenated products thereof; non-diene polymer; and natural rubber.

Specific examples of the rubbery polymer differing from the conjugated diene polymer according to the present embodiment include butadiene rubber or hydrogenated products thereof; isoprene rubber and hydrogenated products thereof; styrenic elastomer such as styrene-butadiene rubber or hydrogenated products thereof, styrene-butadiene block copolymer or hydrogenated products thereof, and styrene-isoprene block copolymer or hydrogenated products thereof; and acrylonitrile-butadiene rubber or hydrogenated products thereof.

Examples of the non-diene polymer include, but are not limited to, olefinic elastomer such as ethylene-propylene rubber, ethylene-propylene-diene rubber, ethylene-butene-diene rubber, ethylene-butene rubber, ethylene-hexene rubber, and ethylene-octene rubber; butyl rubber; brominated butyl rubber; acrylic rubber; fluororubber; silicone rubber; chlorinated polyethylene rubber; epichlorohydrin rubber; $\alpha,\beta$-unsaturated nitrile-acrylate-conjugated diene copolymer rubber; urethane rubber; and polysulfide rubber.

The rubbery polymers mentioned above may be each a modified rubber to which a polar functional group such as a hydroxy group and an amino group has been imparted.

The weight-average molecular weight of each of the rubbery polymers mentioned above is preferably 2,000 to 2,000,000, and more preferably 5,000 to 1,500,000, for balance between performance and processing properties.

Alternatively, what is called liquid rubber, which has low molecular weight, can be used.

Only one of the above rubbery polymers may be used singly, and two or more thereof may be used in combination.

In the case that the rubber composition constituting the conjugated diene polymer composition according to the present embodiment contains the conjugated diene polymer according to the present embodiment and any of the above rubbery polymers, the blend ratio (mass ratio) of them as conjugated diene polymer/rubbery polymer is preferably 20/80 to 100/0, more preferably 30/70 to 90/10, and even more preferably 50/50 to 80/20.

If the blend ratio as conjugated diene polymer/rubbery polymer is within the range, a vulcanized product having superior balance between low hysteresis loss and wet skid resistance, and having more satisfactory abrasion resistance can be obtained.

The conjugated diene polymer composition according to the present embodiment is particularly suitable, for example, as a composition for various footwear.

To obtain a composition having further superior balance between rebound resilience and wet skid properties, the block ratio of the vinyl aromatic compound is preferably 15% by mass or lower, and more preferably 3% by mass or lower.

Such a conjugated diene polymer composition is particularly suitable, for example, as a composition for tires.

(Reinforcing Filler)

If a silica-based inorganic filler is dispersed as a reinforcing filler in the conjugated diene polymer according to the present embodiment, a vulcanized product of the conjugated diene polymer has superior balance between low hysteresis loss and wet skid resistance and abrasion resistance enough for practical use, and thus superior processability can be imparted.

The silica-based inorganic filler is not limited, and any known silica-based inorganic filler can be used; however, solid particles including constituent units of $SiO_2$ or $Si_3Al$ are preferred, and solid particles including constituent units of $SiO_2$ or $Si_3Al$ as a primary component are more preferred.

Here, the term "primary component" refers to a component contained in the silica-based inorganic filler such that the content of the component is 50% by mass or more, preferably 70% by mass or more, and even more preferably 80% by mass or more.

Examples of the silica-based inorganic filler include, but are not limited to, silica, clay, talc, mica, diatomaceous earth, wollastonite, montmorillonite, zeolite, and inorganic fibrous materials such as glass fibers. In addition, a surface-hydrophobized silica-based inorganic filler or a mixture of a silica-based inorganic filler and an inorganic filler based on a non-silica material can be used.

Among them, silica and glass fibers are preferred, and silica is more preferred, for strength, abrasion resistance, and so forth.

Examples of silica include dry silica, wet silica, and synthesized silicate silica. Among them, wet silica is preferred because of superior balance between improving effect on fracture properties and wet skid resistance, and the nitrogen adsorption specific surface area of the silica-based inorganic filler as determined in a BET adsorption method is preferably 100 to 300 m$^2$/g, and more preferably 170 to 250 m$^2$/g, to achieve good abrasion resistance and fracture properties for practical use.

As necessary, a silica-based inorganic filler having a relatively small specific surface area (e.g., a specific area of 200 m$^2$/g or smaller) and a silica-based inorganic filler having a relatively large specific surface area (e.g., a specific area of 200 m$^2$/g or larger) can be used in combination. Thereby, good abrasion resistance and fracture properties and low hysteresis loss can be balanced at a high level.

In the case that a silica-based inorganic filler is used as a reinforcing filler for the conjugated diene polymer composition according to the present embodiment, the content of the silica-based inorganic filler is preferably 1 to 150 parts by mass, preferably 5 to 150 parts by mass, and more preferably 20 to 100 parts by mass, based on 100 parts by mass of the rubber composition containing the conjugated diene polymer according to the present embodiment.

The content of the silica-based inorganic filler is preferably 0.5 parts by mass or more to allow the silica-based inorganic filler to exhibit the effect of addition, and, on the other hand, preferably 300 parts by mass or less to disperse the silica-based inorganic filler sufficiently to make the processability and abrasion resistance of the composition enough for practical use.

(Carbon black)

The conjugated diene polymer composition according to the present embodiment may contain carbon black.

The carbon black is not limited, and carbon blacks of various classes including SRF, FEF, HAF, ISAF, and SAF can be used. Among them, carbon blacks having a nitrogen adsorption specific surface area of 50 $m^2/g$ or larger and a dibutyl phthalate (DBP) adsorption of 80 mL/100 g are preferred.

The content of carbon black is preferably 0.5 to 100 parts by mass, more preferably 3 to 100 parts by mass, and even more preferably 5 to 50 parts by mass, based on 100 parts by mass of the rubber composition containing the conjugated diene polymer according to the present embodiment.

The content of carbon black is preferably 0.5 parts by mass or more for exhibition of performance required for tire application, etc., such as dry grip performance and conductivity, and is preferably 100 parts by mass or less for dispersibility.

(Metal Oxide/Metal Hydroxide)

The conjugated diene polymer composition according to the present embodiment may contain a metal oxide or metal hydroxide in addition to the above-described silica-based inorganic filler and carbon black.

The metal oxide is a solid particle including constituent units of the chemical formula $M_xO_y$ as a primary component, where M represents a metal atom, and x and y each represent an integer of 1 to 6, and applicable examples thereof include, but are not limited to, alumina, titanium oxide, magnesium oxide, and zinc oxide. In addition, a mixture of a metal oxide and an inorganic filler other than metal oxides can be used.

Examples of the metal hydroxide include, but are not limited to, aluminum hydroxide, magnesium hydroxide, and zirconium hydroxide.

(Silane Coupling Agent)

The conjugated diene polymer composition according the present embodiment may contain a silane coupling agent.

The silane coupling agent has a function to strengthen the interaction between the rubber component and the silica-based inorganic filler, and has groups having affinity for or bondability to the rubber composition and the silica-based inorganic filler, respectively, and compounds having a sulfur bonding moiety, an alkoxysilyl group, and a silanol group moiety in one molecule are typically used.

Examples of the silane coupling agent include, but are not limited to, bis-[3-(triethoxysilyl)-propyl]-tetrasulfide, bis-[3-(triethoxysilyl)-propyl]-disulfide, and bis-[2-(triethoxysilyl)-ethyl]-tetrasulfide.

The content of the silane coupling agent is preferably 0.1 to 30 parts by mass, more preferably 0.5 to 20 parts by mass, and even more preferably 1 to 15 parts by mass, based on 100 parts by mass of the silica-based inorganic filler. If the amount of the silane coupling agent blended is within the range, more significant effect of addition of the silane coupling agent is achieved.

(Rubber Softener)

The conjugated diene polymer composition according to the present embodiment may contain a rubber softener to improve processability.

Mineral oil and liquid or low-molecular-weight synthesized softeners are suitable as the rubber softener.

Mineral oil rubber softeners include oils called process oils or extender oils used for softening or bulking of rubber, or improving the processability of rubber, and, among them, oils as a mixture of an aromatic ring, a naphthenic ring, and a paraffinic chain in which the number of carbon atoms of the paraffinic chain accounts for 50% or more of the total number of carbon atoms are called paraffinic oils, oils as such a mixture in which the number of carbon atoms of the naphthenic ring accounts for 30 to 45% of the total number of carbon atoms are called naphthenic oils, and oils as such a mixture in which the number of carbon atoms of the aromatic ring accounts for more than 30% of the total number of carbon atoms are called aromatic oils.

Preferred as the rubber softener to be used for the conjugated diene polymer composition are aromatic oil substitutes having 3% by mass or less of polycyclic aromatic (PCA) components as measured in the IP346 method for environmental safety, preventing oil bleeding, and wet skid properties.

The content of the rubber softener is preferably 0 to 100 parts by mass, more preferably 10 to 90 parts by mass, and even more preferably 30 to 90 parts by mass, based on 100 parts by mass of the rubber composition containing the conjugated diene polymer according to the present embodiment.

If the content of the rubber softener is more than 100 parts by mass based on 100 parts by mass of the rubber composition, bleeding-out is likely to occur and stickiness may be caused to the surface of the conjugated diene polymer composition according to the present embodiment.

(Additional Additives)

An additional softener or filler other than those described above may be used for the conjugated diene polymer composition according to the present embodiment, and various additives may be further used such as a heat stabilizer, an antistatic agent, a weathering stabilizer, an anti-aging agent, a colorant, and a lubricant.

Known softeners can be used as the additional softener.

Specific examples of the additional filler include calcium carbonate, magnesium carbonate, aluminum sulfate, and barium sulfate.

Known materials can be used for the heat stabilizer, antistatic agent, weathering stabilizer, anti-aging agent, colorant, and lubricant.

(Method for Producing Conjugated Diene Polymer Composition)

The method for producing the conjugated diene polymer composition according to the present embodiment is not limited.

Examples of the method include a method of melt-kneading together the above-described rubber composition, reinforcing filler, vulcanizing agent, and vulcanization accelerator, and, as necessary, the above-described various materials by using a common mixer such as an open roll, a Banbury mixer, a kneader, a single-screw extruder, a twin-screw extruder, and a multi-screw extruder; and a method in which the components are dissolved in a solvent and mixed together and the solvent is then removed through heating.

Among them, the melt-kneading method with a roll, a Banbury mixer, a kneader, or an extruder is preferred for productivity and good kneading.

Methods of kneading the conjugated diene polymer and the various materials together in one operation and methods of mixing them together in multiple operations are both applicable.

The conjugated diene polymer composition is suitably used as a vulcanized product.

The vulcanized product can be obtained by mixing together the conjugated diene polymer and reinforcing filler, and, as necessary, an inorganic filler such as carbon black, a rubbery polymer differing from the conjugated diene polymer, a silane coupling agent, a rubber softener, a vulcanizing agent, and a vulcanization accelerator/vulcanization aid, and heating the mixture to vulcanize.

Applicable examples of the vulcanizing agent include radical generators such as organic peroxides and azo compounds, oxime compounds, nitroso compounds, polyamine compounds, sulfur, and sulfur compounds. Sulfur compounds include sulfur monochloride, sulfur dichloride, disulfide compounds, and polysulfide polymer compounds.

The content of the vulcanizing agent is typically 0.01 to 20 parts by mass, and preferably 0.1 to 15 parts by mass, based on 100 parts by mass of the rubber component containing the conjugated diene polymer according to the present embodiment. Known vulcanization methods can be applied, and the vulcanization temperature is typically 120 to 200° C., and preferably 140 to 180° C.

Conventionally known materials can be used for the vulcanization accelerator, and examples thereof include vulcanization accelerators/aids of sulfenamide, guanidine, thiram, aldehyde-amine, aldehyde-ammonia, thiazole, thiourea, and dithiocarbamate.

The content of the vulcanization accelerator is typically 0.01 to 20 parts by mass, and more preferably 0.1 to 15 parts by mass, based on 100 parts by mass of the rubber component containing the conjugated diene polymer according to the present embodiment.

The content of the vulcanizing agent and vulcanization accelerator is preferably 0.1 parts by mass to 20 parts by mass, more preferably 0.1 to 18 parts by mass, and even more preferably 0.1 to 15 parts by mass, based on 100 parts by mass of the rubber composition containing the conjugated diene polymer according to the present embodiment.

Applicable examples of the vulcanization aid include zinc flower and stearic acid.

The conjugated diene polymer composition according to the present embodiment can be crosslinked by adding a vulcanizing agent, a vulcanization accelerator, and various additives, etc., and used as a rubber composition for producing a rubber product intended.

The rubber composition formed through crosslinking the conjugated diene polymer composition can be used for tires, anti-vibration rubbers, and various products for industrial use.

EXAMPLES

Hereinafter, the present embodiment will be described in detail with reference to specific Examples and Comparative Examples; however, the present embodiment is by no means limited to the following Examples.

Analysis of samples was performed in the following manner.

(1) Bonded Styrene Content

A sample of 100 mg of a conjugated diene polymer obtained in each of Production Examples described later was placed in a graduated cylinder and chloroform was added thereto to a volume of 100 mL to dissolve the sample, and the resultant was used as a measurement sample.

By using a V-550 produced by JASCO Corporation, the bonded styrene content (% by mass) was measured from UV absorption at 254 nm due to the phenyl group of styrene.

(2) Microstructure of Butadiene Moiety (1,2-Vinyl Bond Content)

A sample of 50 mg of a conjugated diene polymer obtained in each of Production Examples described later was dissolved in 50 mL of carbon disulfide, and an infrared spectrum in the range of 600 to 1,000 $cm^{-1}$ was obtained in measurement with a solution cell, and the microstructure of the butadiene moiety (1,2-vinyl bond content (%)) was determined from a specific absorbance by using the calculation formula of the Hampton's method.

(3) GPC Molecular Weight Distribution

A specimen of each of conjugated diene polymers obtained in Production Examples and conjugated diene polymers obtained in Examples and Comparative Examples was subjected to GPC (2695 produced by Waters Corporation) with a polystyrene-based gel column (column: PLgel MiniMix-C×3, column oven temperature: 35° C., 865-CO produced by JASCO Corporation, THF flow rate: 0.35 mL, sample concentration: 0.1% by mass, injection volume: 50 μL, RI detector: 2414 produced by Waters Corporation) to determine the chromatograph.

A calibration curve was prepared by using commercially available standard monodispersed polystyrenes having known molecular weights, and used to determine the number of peaks, peak molecular weights (peak molecular weights before and after coupling, peak molecular weights of blends), and peak area percentages from the GPC chromatogram obtained.

Tetrahydrofuran (THF) was used as an eluent.

In 20 mL of THF, 10 mg of a measurement sample was dissolved, which was injected into the column for measurement. The measurement was performed at an oven temperature of 40° C.

(4) Proportion of Modified Polymer Chains in Conjugated Diene Polymer

In determination of the proportion of modified polymer chains in a conjugated diene polymer, the property of conjugated diene polymer having a nitrogen atom or the like to be adsorbed on a GPC column with a packing material of silica-based gel is utilized; specifically, a sample solution containing a sample and standard polystyrene with a molecular weight of 5,000 (polystyrene is not adsorbed on the column) was subjected to GPC (2695 produced by Waters Corporation) with a polystyrene-based gel column (column: PLgel MiniMix-C×3, column oven temperature: 35° C., 865-CO produced by JASCO Corporation, THF flow rate: 0.35 mL, RI detector: 2414 produced by Waters Corporation) and GPC (2695 produced by Waters Corporation) with a silica-based gel column (column: Zorbax PSM 1000-S×1, PSM 300-S×1, PSM 60-S×1, three columns in total, column oven temperature: 35° C., 865-CO produced by JASCO Corporation, THF flow rate: 0.7 mL/min, RI detector: 2414 produced by Waters Corporation) to determine a chromatogram for each measurement with an RI detector, and the amount of adsorption of the conjugated diene polymer having a nitrogen atom or the like adsorbed on the silica column was calculated from the difference between the chromatograms to determine the proportion of polymer chains having a structure modified with a compound having a nitrogen atom or the like at a molecular end (hereinafter, also referred to as "proportion of modified polymer chains").

In the measurement, 10 mg of the sample was dissolved in 20 mL of THF together with 5 mg of the standard polystyrene, and 100 μL of the resultant was injected.

In the specific procedure of calculation, the areas (%) determined for the polystyrene-based gel column and the silica-based column were applied to the following expression.

$$\text{Proportion of modified polymer chains} = \frac{(a/b) - (c/d)}{(a/b)} \times 100\,(\%)$$

The definitions of a, b, c, and d in the expression are as follows.
a: Area (%) for entire polymer determined with polystyrene-based gel (PLgel)
b: Area (%) for low-molecular-weight internal standard polystyrene (PS) determined with polystyrene-based gel (PLgel)
c: Area (%) for entire polymer determined with silica-based column (Zorbax)
d: Area (%) for low-molecular-weight internal standard polystyrene (PS) determined with silica-based column (Zorbax)
(5) Coupling Rate For determination of a coupling rate, a specimen of a conjugated diene polymer to which a coupling agent had not been added yet was subjected to GPC (2695 produced by Waters Corporation) with a polystyrene-based gel column (column: PLgel MiniMix-C×3, column oven temperature: 35° C., 865-CO produced by JASCO Corporation, THF flow rate: 0.35 mL, sample concentration: 0.1% by mass, injection volume: 50 μL, RI detector: 2414 produced by Waters Corporation) to determine the chromatograph.

The coupling rate was calculated from the ratio between a peak area without coupling (a peak with lower molecular weight) and a peak area with coupling (a peak with higher molecular weight).
(6) Nitrogen content The nitrogen content of each of conjugated diene polymers obtained in Production Examples and conjugated diene polymers obtained in Examples and Comparative Examples was calculated by using a TN-2100H produced by Mitsubishi Chemical Analytech Co., Ltd. in accordance with a method described in "4. Chemiluminescence method" in JIS K 2609: 1998 "Crude petroleum and petroleum products—Determination of nitrogen content".
(7) Preparative HPLC A specimen of each of conjugated diene polymers obtained in Examples and Comparative Examples was fractionated through preparative HPLC (LC-9201 produced by Japan Analytical Industry Co., Ltd.) with a polystyrene-based gel column (column: JAIGEL-5H×2, chloroform flow rate: 3.8 mL/min, sample concentration: 5.0% by mass, injection volume: 3 mL, RI detector: RI-50S produced by Japan Analytical Industry Co., Ltd.).

Eluent was fractionated by using a switching valve with conditions for separating the peak (A) and the peak (B) selected. Each of the fractions resulting from the fractionation of the eluent was desolvated to afford a conjugated diene polymer in the peak (A) and a conjugated diene polymer in the peak (B).
(8) Glass Transition Temperature and Number of Glass Transition Temperature Peaks In accordance with ISO 22768: 2006, a DSC curve was recorded for each of conjugated diene polymers obtained in Production Examples and conjugated diene polymers obtained in Examples and Comparative Examples while the temperature was elevated within a given temperature range, and a peak top (inflection point) in the DSC differential curve was defined as the glass transition temperature.

The glass transition temperature of a conjugated diene polymer in the peak (A) (Tg (A)) and the glass transition temperature of a conjugated diene polymer in the peak (B) (Tg (B)) for each conjugated diene polymer after blending were determined, and the absolute value of difference therebetween was calculated.

In determining the number of glass transition temperature peaks for the whole of each conjugated diene polymer obtained after blending, the whole of the conjugated diene polymer after blending was directly subjected to the above procedure without separately collecting, and the number of glass transition temperature peaks was determined from the DSC curve.

Production Example 1

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF) and 2.04 g of 2,2-bis(2-oxolanyl) propane (BOP) were loaded, where impurities had been removed from the materials in advance, and the inner temperature of the reactor was retained at 47° C.

As a polymerization initiator, 0.98 g of n-butyllithium (indicated as "nBL" in Tables) was fed to the reactor.

After the initiation of polymerization reaction, the temperature in the reactor began to elevate through heat generation due to polymerization, and ultimately reached 73° C.

Two minutes after the reaction temperature reached the peak, 0.65 g of silicon tetrachloride (indicated as "Cup1" in Tables) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (A-1) containing a conjugated diene polymer (sample A).

Analysis of the sample A found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 2

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 3.20 g of 2,2-bis(2-oxolanyl)propane (BOP), and 2.37 g of piperidine (indicated as "Pip" in Tables) were loaded, where impurities had been removed from the materials in advance, and the inner temperature of the reactor was retained at 43° C.

As a polymerization initiator, 1.53 g of n-butyllithium was fed to the reactor.

After the initiation of polymerization reaction, the temperature in the reactor began to elevate through heat generation due to polymerization, and ultimately reached 74° C.

Two minutes after the reaction temperature reached the peak, 1.53 g of 2,2-dimethoxy-1-(3-trimethoxysilylpropyl)-1-aza-2-silacyclopentane (indicated as "Cup2" in Tables) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (B-1) containing a conjugated diene polymer (sample B).

Analysis of the sample B found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 3

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), 2.04 g of 2,2-bis(2-oxolanyl)propane (BOP), and 1.51 g of piperidine (Pip) were loaded, where impurities had been removed from the materials in advance, and the inner temperature of the reactor was retained at 45° C.

As a polymerization initiator, 0.98 g of n-butyllithium was fed to the reactor.

After the initiation of polymerization reaction, the temperature in the reactor began to elevate through heat generation due to polymerization, and ultimately reached 72° C.

Two minutes after the reaction temperature reached the peak, 0.85 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (C-1) containing a conjugated diene polymer (sample C).

Analysis of the sample C found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Production Example 4

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 2.04 g of 2,2-bis(2-oxolanyl)propane (BOP), and 1.51 g of piperidine (Pip) were loaded, where impurities had been removed from the materials in advance, and the inner temperature of the reactor was retained at 44° C.

As a polymerization initiator, 0.98 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 0.85 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (D-1) containing a conjugated diene polymer (sample D).

Analysis of the sample D found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Production Example 5

Into a temperature-controllable autoclave of 40 L inner volume equipped with a stirrer and a jacket used as a reactor, 2,400 g of 1,3-butadiene, 600 g of styrene, 21,000 g of cyclohexane, and polar substances consisting of 2 g of tetrahydrofuran (THF), 2.04 g of 2,2-bis(2-oxolanyl)propane (BOP), and 1.51 g of piperidine (Pip) were loaded, where impurities had been removed from the materials in advance, and the inner temperature of the reactor was retained at 43° C.

As a polymerization initiator, 0.98 g of n-butyllithium was fed to the reactor.

After the initiation of polymerization reaction, the temperature in the reactor began to elevate through heat generation due to polymerization, and ultimately reached 75° C.

Two minutes after the reaction temperature reached the peak, 0.85 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (E-1) containing a conjugated diene polymer (sample E).

Analysis of the sample E found that the bonded styrene content was 20% by mass and the bonded butadiene content was 80% by mass.

The vinyl bond content (1,2-bond content) of the microstructure of the butadiene moiety determined by calculation from measurement results with an infrared spectrometer in accordance with the Hampton's method was 56%.

Other analytical values are shown in Table 1.

Production Example 6

Into a temperature-controllable autoclave of 40 L inner volume equipped with a stirrer and a jacket used as a reactor, 2,100 g of 1,3-butadiene, 900 g of styrene, 21,000 g of cyclohexane, and polar substances consisting of 2 g of tetrahydrofuran (THF), 2.72 g of 2,2-bis(2-oxolanyl)propane (BOP), and 2.10 g of hexamethyleneimine (HMI) were loaded, where impurities had been removed from the materials in advance, and the inner temperature of the reactor was retained at 46° C.

As a polymerization initiator, 1.17 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 1.2 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (F-1) containing a conjugated diene polymer (sample F).

Analysis of the sample F found that the bonded styrene content was 30% by mass and the bonded butadiene content was 70% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 7

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 2.72 g of 2,2-bis(2-oxolanyl)propane (BOP), and 2.10 g of hexamethyleneimine (HMI) were loaded, where impurities had been removed from the materials in advance, and the inner temperature of the reactor was retained at 46° C.

As a polymerization initiator, 1.17 g of n-butyllithium was fed to the reactor.

After the initiation of polymerization reaction, the temperature in the reactor began to elevate through heat generation due to polymerization, and ultimately reached 73° C.

Two minutes after the reaction temperature reached the peak, 1.2 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (G-1) containing a conjugated diene polymer (sample G).

Analysis of the sample G found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 8

Into a temperature-controllable autoclave of 40 L inner volume equipped with a stirrer and a jacket used as a reactor, 2,400 g of 1,3-butadiene, 600 g of styrene, 21,000 g of cyclohexane, and polar substances consisting of 2 g of tetrahydrofuran (THF), 2.72 g of 2,2-bis(2-oxolanyl)propane (BOP), and 2.10 g of hexamethyleneimine (HMI) were loaded, where impurities had been removed from the materials in advance, and the inner temperature of the reactor was retained at 42° C.

As a polymerization initiator, 1.17 g of n-butyllithium was fed to the reactor.

After the initiation of polymerization reaction, the temperature in the reactor began to elevate through heat generation due to polymerization, and ultimately reached 74° C.

Two minutes after the reaction temperature reached the peak, 1.2 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (H-1) containing a conjugated diene polymer (sample H).

Analysis of the sample H found that the bonded styrene content was 20% by mass and the bonded butadiene content was 80% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 9

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), and 4.87 g of 2,2-bis(2-oxolanyl)propane (BOP) were loaded, where impurities had been removed from the materials in advance, and the inner temperature of the reactor was retained at 44° C.

As a polymerization initiator, 2.85 g of n-butyllithium (nBL) was fed to the reactor.

After the initiation of polymerization reaction, the temperature in the reactor began to elevate through heat generation due to polymerization, and ultimately reached 76° C.

Two minutes after the reaction temperature reached the peak, 1.66 g of silicon tetrachloride (Cup1) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (I-1) containing a conjugated diene polymer (sample I).

Analysis of the sample I found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 10

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), and 4.87 g of 2,2-bis(2-oxolanyl)propane (BOP) were loaded, where impurities had been removed from the materials in advance, and the inner temperature of the reactor was retained at 46° C.

As a polymerization initiator, 2.85 g of n-butyllithium (nBL) was fed to the reactor.

After the initiation of polymerization reaction, the temperature in the reactor began to elevate through heat generation due to polymerization, and ultimately reached 75° C.

Two minutes after the reaction temperature reached the peak, 1.66 g of silicon tetrachloride (Cup1) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (J-1) containing a conjugated diene polymer (sample J).

Analysis of the sample J found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 11

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), 4.87 g of 2,2-bis(2-oxolanyl)propane (BOP), and 4.41 g of piperidine (Pip) were loaded, where impurities had been removed from the materials in advance, and the inner temperature of the reactor was retained at 43° C.

As a polymerization initiator, 2.85 g of n-butyllithium (nBL) was fed to the reactor.

After the initiation of polymerization reaction, the temperature in the reactor began to elevate through heat generation due to polymerization, and ultimately reached 76° C.

Two minutes after the reaction temperature reached the peak, 2.4 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (K-1) containing a conjugated diene polymer (sample K).

Analysis of the sample K found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 12

Into a temperature-controllable autoclave of 40 L inner volume equipped with a stirrer and a jacket, as a reactor, 2,190 g of 1,3-butadiene, 810 g of styrene, 21,000 g of cyclohexane, and polar substances consisting of 2 g of tetrahydrofuran (THF), 4.87 g of 2,2-bis(2-oxolanyl)propane (BOP), and 4.41 g of piperidine (Pip) were loaded, where impurities had been removed from the materials in advance, and the inner temperature of the reactor was retained at 43° C.

As a polymerization initiator, 2.85 g of n-butyllithium (nBL) was fed to the reactor.

After the initiation of polymerization reaction, the temperature in the reactor began to elevate through heat generation due to polymerization, and ultimately reached 75° C.

Two minutes after the reaction temperature reached the peak, 2.4 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (L-1) containing a conjugated diene polymer (sample L).

Analysis of the sample L found that the bonded styrene content was 27% by mass and the bonded butadiene content was 73% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 13

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), 4.87 g of 2,2-bis(2-oxolanyl)propane (BOP), and 4.41 g of piperidine (Pip) were loaded, where impurities had been removed from the materials in advance, and the inner temperature of the reactor was retained at 43° C.

As a polymerization initiator, 2.85 g of n-butyllithium (nBL) was fed to the reactor.

After the initiation of polymerization reaction, the temperature in the reactor began to elevate through heat generation due to polymerization, and ultimately reached 73° C.

Two minutes after the reaction temperature reached the peak, 0.81 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (M-1) containing a conjugated diene polymer (sample M).

Analysis of the sample M found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 1.

Production Example 14

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), 7.0 g of 2,2-bis(2-oxolanyl)propane (BOP), and 6.64 g of hexamethyleneimine (HMI) were loaded, where impurities had been removed from the materials in advance, and the inner temperature of the reactor was retained at 41° C.

As a polymerization initiator, 4.05 g of n-butyllithium (nBL) was fed to the reactor.

After the initiation of polymerization reaction, the temperature in the reactor began to elevate through heat generation due to polymerization, and ultimately reached 73° C.

Two minutes after the reaction temperature reached the peak, 3.6 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (N-1) containing a conjugated diene polymer (sample N).

Analysis of the sample N found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 15

Into a temperature-controllable autoclave of 40 L inner volume equipped with a stirrer and a jacket, as a reactor, 2,220 g of 1,3-butadiene, 780 g of styrene, 21,000 g of cyclohexane, and polar substances consisting of 2 g of tetrahydrofuran (THF), 7.0 g of 2,2-bis(2-oxolanyl)propane (BOP), and 6.64 g of hexamethyleneimine (HMI) were loaded, where impurities had been removed from the materials in advance, and the inner temperature of the reactor was retained at 40° C.

As a polymerization initiator, 4.05 g of n-butyllithium (nBL) was fed to the reactor.

After the initiation of polymerization reaction, the temperature in the reactor began to elevate through heat generation due to polymerization, and ultimately reached 74° C.

Two minutes after the reaction temperature reached the peak, 3.6 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (0-1) containing a conjugated diene polymer (sample O).

Analysis of the sample O found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 16

Into a temperature-controllable autoclave of 40 L inner volume equipped with a stirrer and a jacket used as a reactor, 2,400 g of 1,3-butadiene, 600 g of styrene, 21,000 g of cyclohexane, and polar substances consisting of 2 g of tetrahydrofuran (THF), 7.0 g of 2,2-bis(2-oxolanyl)propane (BOP), and 6.64 g of hexamethyleneimine (HMI) were loaded, where impurities had been removed from the materials in advance, and the inner temperature of the reactor was retained at 42° C.

As a polymerization initiator, 4.05 g of n-butyllithium (nBL) was fed to the reactor.

After the initiation of polymerization reaction, the temperature in the reactor began to elevate through heat generation due to polymerization, and ultimately reached 75° C.

Two minutes after the reaction temperature reached the peak, 3.6 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (P-1) containing a conjugated diene polymer (sample P).

Analysis of the sample P found that the bonded styrene content was 20% by mass and the bonded butadiene content was 80% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 17

Into a temperature-controllable autoclave of 40 L inner volume equipped with a stirrer and a jacket used as a reactor, 2,040 g of 1,3-butadiene, 960 g of styrene, 21,000 g of cyclohexane, and polar substances consisting of 2 g of tetrahydrofuran (THF), 8.3 g of 2,2-bis(2-oxolanyl)propane (BOP), and 7.46 g of hexamethyleneimine (HMI) were loaded, where impurities had been removed from the materials in advance, and the inner temperature of the reactor was retained at 40° C.

As a polymerization initiator, 4.82 g of n-butyllithium (nBL) was fed to the reactor.

After the initiation of polymerization reaction, the temperature in the reactor began to elevate through heat generation due to polymerization, and ultimately reached 76° C.

Two minutes after the reaction temperature reached the peak, 5.11 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (Q-1) containing a conjugated diene polymer (sample Q).

Analysis of the sample Q found that the bonded styrene content was 32% by mass and the bonded butadiene content was 68% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 18

Into a temperature-controllable autoclave of 40 L inner volume equipped with a stirrer and a jacket used as a reactor, 2,610 g of 1,3-butadiene, 390 g of styrene, 21,000 g of cyclohexane, and polar substances consisting of 2 g of tetrahydrofuran (THF), 1.13 g of 2,2-bis(2-oxolanyl)propane (BOP), and 6.2 g of hexamethyleneimine (HMI) were loaded, where impurities had been removed from the materials in advance, and the inner temperature of the reactor was retained at 40° C.

As a polymerization initiator, 3.92 g of n-butyllithium (nBL) was fed to the reactor.

After the initiation of polymerization reaction, the temperature in the reactor began to elevate through heat generation due to polymerization, and ultimately reached 76° C.

Two minutes after the reaction temperature reached the peak, 4.10 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (R-1) containing a conjugated diene polymer (sample R).

Analysis of the sample R found that the bonded styrene content was 13% by mass and the bonded butadiene content was 87% by mass.

The vinyl bond content (1,2-bond content) of the microstructure of the butadiene moiety determined by calculation from measurement results with an infrared spectrometer in accordance with the Hampton's method was 30%.

Other analytical values are shown in Table 2.

Production Example 19

Into a temperature-controllable autoclave of 40 L inner volume equipped with a stirrer and a jacket used as a reactor, 2,100 g of 1,3-butadiene, 900 g of styrene, 21,000 g of cyclohexane, and polar substances consisting of 2 g of tetrahydrofuran (THF), 2.88 g of 2,2-bis(2-oxolanyl)propane (BOP), and 2.2 g of piperidine (Pip) were loaded, where impurities had been removed from the materials in advance, and the inner temperature of the reactor was retained at 43° C.

As a polymerization initiator, 1.42 g of n-butyllithium (nBL) was fed to the reactor.

After the initiation of polymerization reaction, the temperature in the reactor began to elevate through heat generation due to polymerization, and ultimately reached 74° C.

Two minutes after the reaction temperature reached the peak, 2.4 g of 1,3-dimethyl-2-dimethylimidazolidinone (indicated as "DMI" in Table 2) as a modifier was added to the reactor, and the resultant was subjected to coupling reaction for 10 minutes.

To the polymer solution, 11 g of n-octadecyl-3-(3,5-di-t-butyl-4-hydroxyphenyl)-propionate and 4.5 g of 4,6-bis(octylthiomethyl)-o-cresol as antioxidants were added to afford a polymer solution (S-1) containing a conjugated diene polymer (sample S).

Analysis of the sample S found that the bonded styrene content was 30% by mass and the bonded butadiene content was 70% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 20

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), and 3.20 g of 2,2-bis(2-oxolanyl)propane (BOP) were loaded, where impurities had been removed from the materials in advance, and the inner temperature of the reactor was retained at 43° C.

As a polymerization initiator, 1.53 g of n-butyllithium (nBL) was fed to the reactor.

After the initiation of polymerization reaction, the temperature in the reactor began to elevate through heat generation due to polymerization, and ultimately reached 74° C.

Two minutes after the reaction temperature reached the peak, 0.71 g of silicon tetrachloride (Cup1) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (T-1) containing a conjugated diene polymer (sample T).

Analysis of the sample T found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 21

Into a temperature-controllable autoclave of 40 L inner volume equipped with a stirrer and a jacket used as a reactor, 2,400 g of 1,3-butadiene, 600 g of styrene, 21,000 g of cyclohexane, and polar substances consisting of 2 g of tetrahydrofuran (THF), and 3.20 g of 2,2-bis(2-oxolanyl)propane (BOP) were loaded, where impurities had been removed from the materials in advance, and the inner temperature of the reactor was retained at 42° C.

As a polymerization initiator, 1.53 g of n-butyllithium (nBL) was fed to the reactor.

After the initiation of polymerization reaction, the temperature in the reactor began to elevate through heat generation due to polymerization, and ultimately reached 75° C.

Two minutes after the reaction temperature reached the peak, 0.71 g of silicon tetrachloride (Cup1) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (U-1) containing a conjugated diene polymer (sample U).

Analysis of the sample U found that the bonded styrene content was 20% by mass and the bonded butadiene content was 80% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 22

Into a temperature-controllable autoclave of 40 L inner volume equipped with a stirrer and a jacket used as a reactor, 2,400 g of 1,3-butadiene, 600 g of styrene, 21,000 g of cyclohexane, and polar substances consisting of 2 g of tetrahydrofuran (THF), 3.20 g of 2,2-bis(2-oxolanyl)propane (BOP), and 2.6 g of hexamethyleneimine (HMI) were loaded, where impurities had been removed from the materials in advance, and the inner temperature of the reactor was retained at 42° C.

As a polymerization initiator, 1.53 g of n-butyllithium (nBL) was fed to the reactor.

After the initiation of polymerization reaction, the temperature in the reactor began to elevate through heat generation due to polymerization, and ultimately reached 75° C.

Two minutes after the reaction temperature reached the peak, 1.24 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (V-1) containing a conjugated diene polymer (sample V).

Analysis of the sample V found that the bonded styrene content was 20% by mass and the bonded butadiene content was 80% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 23

Into a temperature-controllable autoclave of 40 L inner volume equipped with a stirrer and a jacket used as a reactor, 1,440 g of 1,3-butadiene, 1,200 g of styrene, 21,000 g of cyclohexane, and polar substances consisting of 8.5 g of tetrahydrofuran (THF), and 1.6 g of piperidine (Pip) were loaded, where impurities had been removed from the materials in advance, and the inner temperature of the reactor was retained at 50° C.

As a polymerization initiator, 1.11 g of n-butyllithium (nBL) was fed to the reactor.

After the initiation of polymerization reaction, the temperature in the reactor began to elevate through heat generation due to polymerization to reach a temperature peak, and thereafter 360 g of 1,3-butadiene was additionally added to the reactor over 5 minutes, and the temperature in the reactor ultimately reached 75° C.

Two minutes after the reaction temperature reached the peak, 0.74 g of 2,2-dimethoxy-1-(3-trimethoxysilylpropyl)-1-aza-2-silacyclopentane (Cup2) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (W-1) containing a conjugated diene polymer (sample W).

Analysis of the sample W found that the bonded styrene content was 40% by mass and the bonded butadiene content was 60% by mass.

The vinyl bond content (1,2-bond content) of the microstructure of the butadiene moiety determined by calculation from measurement results with an infrared spectrometer in accordance with the Hampton's method was 21%.

Other analytical values are shown in Table 2.

Production Example 24

Into a temperature-controllable autoclave of 40 L inner volume equipped with a stirrer and a jacket, as a reactor, 2,220 g of 1,3-butadiene, 780 g of styrene, 21,000 g of cyclohexane, and polar substances consisting of 2 g of tetrahydrofuran (THF), and 3.20 g of 2,2-bis(2-oxolanyl)propane (BOP) were loaded, where impurities had been removed from the materials in advance, and the inner temperature of the reactor was retained at 43° C.

As a polymerization initiator, 1.53 g of n-butyllithium (nBL) was fed to the reactor.

After the initiation of polymerization reaction, the temperature in the reactor began to elevate through heat generation due to polymerization, and ultimately reached 74° C.

Two minutes after the reaction temperature reached the peak, 1.16 g of 1-[3-(triethoxysilyl)-propyl]-4-methylpiperazine (indicated as "Cup3" in Table 2) as a coupling agent was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (X-1) containing a conjugated diene polymer (sample X).

Analysis of the sample X found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

Production Example 25

Into a temperature-controllable autoclave of 40 L inner volume equipped with a stirrer and a jacket used as a reactor, 2,220 g of 1,3-butadiene, 780 g of styrene, 21,000 g of cyclohexane, and polar substances consisting of 2 g of tetrahydrofuran (THF), 3.20 g of 2,2-bis(2-oxolanyl)propane (BOP), and 2.3 g of piperidine (Pip) were loaded, where impurities had been removed from the materials in advance, and the inner temperature of the reactor was retained at 42° C.

As a polymerization initiator, 1.53 g of n-butyllithium (nBL) was fed to the reactor.

After the initiation of polymerization reaction, the temperature in the reactor began to elevate through heat generation due to polymerization, and ultimately reached 74° C.

Two minutes after the reaction temperature reached the peak, 2.7 g of 1,3-dimethyl-2-dimethylimidazolidinone (DMI) as a modifier was added to the reactor, and the resultant was subjected to coupling reaction for 10 minutes.

To the polymer solution, 9.2 g of n-octadecyl-3-(3,5-di-t-butyl-4-hydroxyphenyl)-propionate and 3.8 g of 4,6-bis(octylthiomethyl)-o-cresol as antioxidants were added to afford a polymer solution (Y-1) containing a conjugated diene polymer (sample Y).

Analysis of the sample Y found that the bonded styrene content was 26% by mass and the bonded butadiene content was 74% by mass.

The vinyl bond content (1,2-bond content) of the microstructure of the butadiene moiety determined by calculation from measurement results with an infrared spectrometer in accordance with the Hampton's method was 55%.

Other analytical values are shown in Table 2.

TABLE 1

|  |  | Production Example 1 Sample A | Production Example 2 Sample B | Production Example 3 Sample C | Production Example 4 Sample D | Production Example 5 Sample E | Production Example 6 Sample F | Production Example 7 Sample G | Production Example 8 Sample H | Production Example 9 Sample I | Production Example 10 Sample J | Production Example 11 Sample K | Production Example 12 Sample L | Production Example 13 Sample M |
|---|---|---|---|---|---|---|---|---|---|---|---|---|---|---|
| Polymerization initiator |  | nBL | nBL | nBL | nBL | nBL | nBL | nBL | nBL | nBL | nBL | nBL | nBL | nBL |
| Compound having nitrogen atom |  | — | Pip | Pip | Pip | Pip | HMI | HMI | HMI | — | — | Pip | Pip | Pip |
| Coupling agent or modifier |  | Cup1 | Cup2 | Cup2 | Cup2 | Cup2 | Cup2 | Cup2 | Cup2 | Cup1 | Cup1 | Cup2 | Cup2 | Cup2 |
| Bonded styrene content | (% by mass) | 26 | 26 | 32 | 26 | 20 | 30 | 26 | 20 | 26 | 32 | 32 | 27 | 32 |
| 1,2-Vinyl bond content | (%) | 55 | 55 | 56 | 56 | 56 | 55 | 55 | 55 | 55 | 55 | 55 | 55 | 55 |
| Peak molecular weight Before coupling | (× 10,000) | 24 | 20 | 32 | 32 | 32 | 24 | 24 | 24 | 12 | 12 | 12 | 12 | 12 |
| Peak molecular weight After coupling | (× 10,000) | 72 | 52 | 102 | 102 | 102 | 72 | 72 | 72 | 30 | 30 | 30 | 30 | 30 |
| Coupling rate | (%) | 83 | 65 | 83 | 83 | 83 | 83 | 83 | 83 | 87 | 87 | 85 | 85 | 30 |
| Glass transition temperature | (° C.) | −26 | −26 | −18 | −26 | −34 | −20 | −26 | −34 | −26 | −18 | −18 | −24.5 | −18 |
| Proportion of modified polymer chains | (%) | 0 | 95 | 97 | 97 | 96 | 96 | 96 | 96 | 0 | 0 | 97 | 97 | 93 |
| Nitrogen content | (ppm) | 0 | 164 | 77 | 77 | 77 | 112 | 112 | 112 | 0 | 0 | 223 | 223 | 191 |

TABLE 2

|  |  | Production Example 14 Sample N | Production Example 15 Sample O | Production Example 16 Sample P | Production Example 17 Sample Q | Production Example 18 Sample R | Production Example 19 Sample S | Production Example 20 Sample T | Production Example 21 Sample U | Production Example 22 Sample V | Production Example 23 Sample W | Production Example 24 Sample X | Production Example 25 Sample Y |
|---|---|---|---|---|---|---|---|---|---|---|---|---|---|
| Polymerization initiator |  | nBL | nBL | nBL | nBL | nBL | nBL | nBL | nBL | nBL | nBL | nBL | nBL |
| Compound having nitrogen atom |  | HMI | HMI | HMI | HMI | HMI | Pip | — | — | HMI | Pip | — | Pip |
| Coupling agent or modifier |  | Cup2 | Cup2 | Cup2 | Cup2 | Cup2 | DMI | Cup1 | Cup1 | Cup2 | Cup2 | Cup3 | DMI |
| Bonded styrene content | (% by mass) | 32 | 26 | 20 | 32 | 13 | 30 | 26 | 20 | 20 | 40 | 26 | 26 |
| 1,2-Vinyl bond content | (%) | 55 | 55 | 55 | 55 | 30 | 55 | 55 | 55 | 55 | 21 | 55 | 55 |
| Peak molecular weight Before coupling | (× 10,000) | 8 | 8 | 8 | 6 | 8 | 21 | 20 | 20 | 20 | 24 | 20 | 20 |
| Peak molecular weight After coupling | (× 10,000) | 20 | 20 | 20 | 16 | 20 | — | 52 | 53 | 52 | 74 | 38 | — |
| Coupling rate | (%) | 87 | 87 | 87 | 86 | 81 | 0 | 70 | 70 | 67 | 55 | 28 | 0 |
| Glass transition temperature | (° C.) | −18 | −24.5 | −34 | −18 | −63 | −21 | −26 | −34 | −26 | −23 | −26 | −26 |
| Proportion of modified polymer chains | (%) | 97 | 97 | 97 | 97 | 97 | 95 | 0 | 0 | 95 | 95 | 89 | 95 |
| Nitrogen content | (ppm) | 335 | 335 | 335 | 543 | 310 | 146 | 0 | 0 | 170 | 104 | 96 | 150 |

The coupling agents and modifier in Tables 1 and 2 are as follows.
 Cup1: silicon tetrachloride
 Cup2: 2,2-dimethoxy-1-(3-trimethoxysilylpropyl)-1-aza-2-silacyclopentane
 Cup3: 1-[3-(triethoxysilyl)-propyl]-4-methylpiperazine
 DMI: 1,3-dimethyl-2-dimethylimidazolidinone The compounds having a nitrogen atom in Tables 1 and 2 are as follows.
 Pip: piperidine
 HMI: hexamethyleneimine Next, the conjugated diene polymers in [Production Example 1] to [Production Example 25] were appropriately combined to produce blended samples.

Comparative Example 1

The polymer solution (A-1) obtained in [Production Example 1] and the polymer solution (I-1) obtained in [Production Example 9] were blended together so that the mass ratio between the sample A and the sample I satisfied sample A:sample I=50:50, and the blend was stirred for mixing to homogeneous state. The solvent was then removed therefrom through steam stripping and the residue was dried with a dryer to afford a blended sample.

The mass ratio for blending is shown in Table 3, and analytical values for the blended sample are shown in Table 6.

Example 1

The polymer solution (A-1) obtained in [Production Example 1] and the polymer solution (J-1) obtained in [Production Example 10] were blended together so that the mass ratio between the sample A and the sample J satisfied sample A:sample J=50:50, and the blend was stirred for mixing to homogeneous state. The solvent was then removed therefrom through steam stripping and the residue was dried with a dryer to afford a blended sample.

The mass ratio for blending is shown in Table 3, and analytical values for the blended sample are shown in Table 6.

Examples 2 to 16, Comparative Examples 2 to 8

Samples shown in Tables 1 and 2 were blended together in the state of solution with a mass ratio shown in Tables 3 to 5 in the same manner as in Comparative Example 1 and Example 1, and the blend was stirred for mixing to homogeneous state.

The solvent was then removed therefrom through steam stripping and the residue was dried with a dryer to afford a blended sample.

The mass ratios for blending in Examples and Comparative Examples are shown in Tables 3 to 5.

Analytical values for the blended samples are shown in Tables 6 to 8.

TABLE 3

|  |  | Comparative Example 1 | Example 1 | Comparative Example 6 |
|---|---|---|---|---|
| Sample A | (%) | 50 | 50 |  |
| Sample B | (%) |  |  |  |
| Sample C | (%) |  |  |  |
| Sample D | (%) |  |  |  |
| Sample E | (%) |  |  |  |
| Sample F | (%) |  |  |  |
| Sample G | (%) |  |  |  |
| Sample H | (%) |  |  |  |
| Sample I | (%) | 50 |  |  |
| Sample J | (%) |  | 50 |  |
| Sample K | (%) |  |  |  |
| Sample L | (%) |  |  |  |
| Sample M | (%) |  |  |  |
| Sample N | (%) |  |  |  |
| Sample O | (%) |  |  |  |
| Sample P | (%) |  |  |  |
| Sample Q | (%) |  |  |  |
| Sample R | (%) |  |  |  |
| Sample S | (%) |  |  |  |
| Sample T | (%) |  |  | 50 |
| Sample U | (%) |  |  | 50 |
| Sample V | (%) |  |  |  |
| Sample W | (%) |  |  |  |
| Sample X | (%) |  |  |  |
| Sample Y | (%) |  |  |  |

TABLE 4

|  |  | Comparative Example 2 | Comparative Example 3 | Comparative Example 4 | Comparative Example 5 | Example 2 | Example 3 | Example 4 | Example 5 | Example 6 | Example 7 | Example 8 |
|---|---|---|---|---|---|---|---|---|---|---|---|---|
| Sample A | (%) |  |  |  |  |  |  |  |  |  |  |  |
| Sample B | (%) | 100 |  |  |  |  |  |  |  |  |  |  |
| Sample C | (%) |  |  |  |  |  | 50 |  |  |  |  |  |
| Sample D | (%) |  | 50 | 50 |  | 50 |  |  |  | 60 |  |  |
| Sample E | (%) |  |  |  |  |  |  | 50 |  |  |  |  |
| Sample F | (%) |  |  |  |  |  |  |  |  | 50 |  |  |
| Sample G | (%) |  |  |  | 50 |  |  |  |  |  | 85 | 70 |
| Sample H | (%) |  |  |  |  |  |  |  |  |  |  |  |
| Sample I | (%) |  |  |  |  |  |  |  |  |  |  |  |
| Sample J | (%) |  |  |  |  |  |  |  |  |  |  |  |
| Sample K | (%) |  |  |  |  |  |  |  |  |  | 15 | 30 |
| Sample L | (%) |  |  |  |  |  |  |  |  | 50 |  |  |
| Sample M | (%) |  |  |  | 50 |  |  |  |  |  |  |  |
| Sample N | (%) |  |  |  |  | 50 |  | 50 |  |  |  |  |
| Sample O | (%) |  |  | 50 |  |  |  |  |  |  |  |  |
| Sample P | (%) |  |  |  |  |  |  |  | 50 |  |  |  |
| Sample Q | (%) |  |  |  |  |  |  |  |  | 40 |  |  |
| Sample R | (%) |  | 50 |  |  |  |  |  |  |  |  |  |

TABLE 4-continued

|  | Comparative Example 2 | Comparative Example 3 | Comparative Example 4 | Comparative Example 5 | Example 2 | Example 3 | Example 4 | Example 5 | Example 6 | Example 7 | Example 8 |
|---|---|---|---|---|---|---|---|---|---|---|---|
| Sample S (%) | | | | | | | | | | | |
| Sample T (%) | | | | | | | | | | | |
| Sample U (%) | | | | | | | | | | | |
| Sample V (%) | | | | | | | | | | | |
| Sample W (%) | | | | | | | | | | | |
| Sample X (%) | | | | | | | | | | | |
| Sample Y (%) | | | | | | | | | | | |

TABLE 5

|  | Example 9 | Example 10 | Example 11 | Example 12 | Example 13 | Example 14 | Example 15 | Example 16 | Comparative Example 7 | Comparative Example 8 |
|---|---|---|---|---|---|---|---|---|---|---|
| Sample A (%) | | | | | 60 | | | | | |
| Sample B (%) | | | | | | | | | 50 | |
| Sample C (%) | | | | | | | | | | |
| Sample D (%) | | | | | | | | | | |
| Sample E (%) | | | | | | | | | | |
| Sample F (%) | | | | | | | | | | |
| Sample G (%) | 50 | 40 | 30 | | 40 | | 70 | | | |
| Sample H (%) | | | | 50 | | | | | | |
| Sample I (%) | | | | | | | | | | |
| Sample J (%) | | | | | | | | | | |
| Sample K (%) | 50 | 60 | 70 | 50 | 30 | 40 | | | | |
| Sample L (%) | | | | | | | | 50 | | |
| Sample M (%) | | | | | 30 | | | | | |
| Sample N (%) | | | | | | | | | | |
| Sample O (%) | | | | | | | | | | |
| Sample P (%) | | | | | | | | | | |
| Sample Q (%) | | | | | | | | | | |
| Sample R (%) | | | | | | | | | | |
| Sample S (%) | | | | | | | 30 | | | |
| Sample T (%) | | | | | | | | | | |
| Sample U (%) | | | | | | | | | | |
| Sample V (%) | | | | | | | | | 50 | |
| Sample W (%) | | | | | | | | 50 | | |
| Sample X (%) | | | | | | | | | | 50 |
| Sample Y (%) | | | | | | | | | | 50 |

TABLE 6

|  |  | Comparative Example 1 | Example 1 | Comparative Example 6 |
|---|---|---|---|---|
| Number of peaks | | 3 | 3 | 2 |
| Peak molecular weight | Peak (A) (×10,000) | 72 | 72 | 53 |
|  | Peak (B) (×10,000) | 30 | 30 | 20 |
| Molecular weight distribution | Peak (A) | 1.06 | 1.07 | 1.06 |
|  | Peak (B) | 1.10 | 1.09 | 1.16 |
| Peak area percentage | Peak (A) (%) | 46 | 46 | 66 |
|  | Peak (B) (%) | 48 | 48 | 34 |
|  | Peak (A) + (B) (%) | 94 | 94 | 100 |
| Tg (A) | (° C.) | −26 | −26 | −23 |
| Tg (B) | (° C.) | −26 | −19 | −23 |
| \|Tg (B) − Tg(A)\| | (° C.) | 0 | 7.0 | 0 |
| Number of Tg peaks | | 1 | 1 | 1 |
| Proportion of modified polymer chains | (%) | 0 | 0 | 0 |
| Nitrogen content | (ppm) | 0 | 0 | 0 |

TABLE 7

|  |  | Comparative Example 2 | Comparative Example 3 | Comparative Example 4 | Comparative Example 5 | Example 2 | Example 3 | Example 4 | Example 5 | Example 6 | Example 7 | Example 8 |
|---|---|---|---|---|---|---|---|---|---|---|---|---|
| Number of peaks | | 2 | 4 | 4 | 3 | 4 | 4 | 4 | 4 | 3 | 3 | 3 |
| Peak molecular weight | Peak (A) (× 10,000) | 52 | 102 | 102 | 72 | 102 | 102 | 102 | 102 | 72 | 72 | 72 |
|  | Peak (B) (× 10,000) | 20 | 20 | 20 | 30 | 20 | 20 | 20 | 16 | 30 | 30 | 30 |

TABLE 7-continued

|  |  | Comparative Example 2 | Comparative Example 3 | Comparative Example 4 | Comparative Example 5 | Example 2 | Example 3 | Example 4 | Example 5 | Example 6 | Example 7 | Example 8 |
|---|---|---|---|---|---|---|---|---|---|---|---|---|
| Molecular weight distribution | Peak (A) | 1.07 | 1.07 | 1.07 | 1.08 | 1.07 | 1.06 | 1.05 | 1.08 | 1.08 | 1.08 | 1.06 |
|  | Peak (B) | 1.17 | 1.11 | 1.10 | 1.10 | 1.11 | 1.09 | 1.12 | 1.09 | 1.10 | 1.10 | 1.10 |
| Peak area percentage | Peak (A) (%) | 65 | 42 | 42 | 42 | 42 | 42 | 42 | 50 | 46 | 71 | 59 |
|  | Peak (B) (%) | 35 | 46 | 44 | 23 | 46 | 46 | 46 | 35 | 48 | 24 | 36 |
|  | Peak (A) + (B) (%) | 100 | 88 | 86 | 65 | 88 | 88 | 88 | 85 | 94 | 95 | 95 |
| Tg (A) | (° C.) | −26 | −26 | −26 | −26 | −26 | −18.5 | −34.5 | −26 | −21 | −26 | −26 |
| Tg (B) | (° C.) | −26 | −25 | −63 | −19 | −19 | −33.5 | −19 | −18.5 | −24 | −20 | −19.5 |
| \|Tg (B)-Tg (A)\| | (° C.) | 0 | 1.0 | 37 | 7.0 | 7.0 | 15.0 | 15.5 | 7.5 | 3.0 | 6.5 | 6.5 |
| Number of Tg peaks |  | 1 | 1 | 1 | 1 | 1 | 1 | 1 | 1 | 1 | 1 | 1 |
| Proportion of modified polymer chains | (%) | 95 | 97 | 97 | 95 | 97 | 97 | 97 | 97 | 97 | 97 | 97 |
| Nitrogen content | (ppm) | 164 | 208 | 193 | 149 | 208 | 208 | 208 | 261 | 168 | 129 | 146 |

TABLE 8

|  |  | Example 9 | Example 10 | Example 11 | Example 12 | Example 13 | Example 14 | Example 15 | Example 16 | Comparative Example 7 | Comparative Example 8 |
|---|---|---|---|---|---|---|---|---|---|---|---|
| Number of peaks |  | 3 | 3 | 3 | 3 | 3 | 3 | 2 | 3 | 2 | 2 |
| Peak molecular weight | Peak (A) (× 10,000) | 72 | 72 | 72 | 72 | 72 | 72 | 72 | 74 | 52 | 38 |
|  | Peak (B) (× 10,000) | 30 | 30 | 30 | 30 | 30 | 30 | 21 | 30 | 20 | 20 |
| Molecular weight distribution | Peak (A) | 1.07 | 1.07 | 1.06 | 1.05 | 1.06 | 1.09 | 1.08 | 1.80 | 1.06 | 1.09 |
|  | Peak (B) | 1.11 | 1.13 | 1.12 | 1.10 | 1.09 | 1.10 | 1.10 | 1.12 | 1.10 | 1.14 |
| Peak area percentage | Peak (A) (%) | 46 | 33 | 26 | 46 | 33 | 50 | 58 | 27 | 66 | 14 |
|  | Peak (B) (%) | 48 | 59 | 63 | 48 | 42 | 44 | 42 | 64 | 34 | 86 |
|  | Peak (A) + (B) (%) | 94 | 92 | 89 | 94 | 75 | 94 | 100 | 91 | 100 | 100 |
| Tg (A) | (° C.) | −26 | −26 | −26 | −34.5 | −26 | −26 | −26 | −28 | −23 | −26 |
| Tg (B) | (° C.) | −19 | −19 | −18.5 | −19 | −19 | −19 | −21.5 | −24 | −23 | −26 |
| \|Tg (B)-Tg (A)\| | (° C.) | 7.0 | 6.5 | 6.5 | 15.5 | 7 | 7 | 4.5 | 4 | 0 | 0 |
| Number of Tg peaks |  | 1 | 1 | 1 | 1 | 1 | 1 | 1 | 2 | 1 | 1 |
| Proportion of modified polymer chains | (%) | 97 | 97 | 97 | 97 | 96 | 39 | 97 | 96 | 95 | 92 |
| Nitrogen content | (ppm) | 168 | 180 | 196 | 168 | 167 | 90 | 122 | 160 | 168 | 123 |

Any one of the conjugated diene polymers as the blended samples obtained in [Examples 1 to 16] and [Comparative Examples 1 to 8] was used as a starting material rubber, and a conjugated diene polymer composition containing the corresponding starting material rubber was obtained in accordance with the formulation shown below.
Conjugated diene polymer (any one of Examples 1 to 16, Comparative Examples 1 to 8): 100.0 parts by mass Silica (produced by Evonik Degussa GmbH, Ultrasil 7000 GR): 75.0 parts by mass
Carbon black (produced by Tokai Carbon Co., Ltd., SEAST KH (N339)): 5.0 parts by mass
Silane coupling agent (produced by Evonik Degussa GmbH, Si75): 6.0 parts by mass
S-RAE oil (produced by Japan energy Inc., JOMO PROCESS NC140): 30.0 parts by mass
Wax (produced by OUCHI SHINKO CHEMICAL INDUSTRIAL CO., LTD., Sunnoc N):1.5 parts by mass
Zinc flower: 2.5 parts by mass
Stearic acid: 2.0 parts by mass
Anti-aging agent (N-isopropyl-N'-phenyl-p-phenylenediamine): 2.0 parts by mass
Sulfur: 1.8 parts by mass
Vulcanization accelerator (N-cyclohexyl-2-benzothiazylsulfinamide): 1.7 parts by mass
Vulcanization accelerator (diphenylguanidine): 2.0 parts by mass
Total: 229.5 parts by mass The above materials were kneaded together in the following manner to afford a conjugated diene polymer composition.

As a first stage of kneading, a starting material rubber, the fillers (silica, carbon black), the silane coupling agent, the process oils (S-RAE oil, wax), zinc flower, and stearic acid were kneaded together by using a sealed kneader (inner volume: 0.3 L) equipped with a temperature controller at a filling rate of 65% and a rotor frequency of 50/57 rpm. At the kneading, the temperature of the sealed mixing machine was controlled so that the discharge temperature (blend) was 155 to 160° C. to afford a conjugated diene polymer composition.

Next, as a second stage of kneading, the thus-obtained blend was cooled to room temperature, the anti-aging agent was then added thereto, and the blend was kneaded again to improve the dispersion of silica. In this kneading, the discharge temperature (blend) was similarly adjusted to 155 to 160° C. through temperature control for the mixing machine.

After cooling, as a third stage of kneading, kneading was performed by using an oven roll set at 70° C. with addition of sulfur and the vulcanization accelerators. The resultant was then molded, and vulcanized with a platen press at 160° C. for 20 minutes.

After the vulcanization, the physical properties of the conjugated diene polymer composition were measured.

The physical properties of the conjugated diene polymer composition, as a vulcanized product after being vulcanized as described above, were measured in the following manner.

(1) Composition Mooney Viscosity (Composition ML)

In accordance with JIS K 6300-1, a Mooney viscometer was pre-heated at 130° C. for 1 minute, thereafter a rotor was rotated at 2 rpm for 4 minutes and viscosity was then measured, and the viscosity was converted to an index relative to a result for Comparative Example 2 as 100. A higher value indicates higher superiority in processability.

(2) Abrasion Resistance

In accordance with JIS K 6264-2, the amount of abrasion at a load of 44.1 N after 1,000 rotations was measured by using an AKRON abrasion tester (produced by YASUDA SEIKI SEISAKUSHO, LTD.), and converted to an index relative to a result for Comparative Example 2 as 100. A higher index indicates higher superiority in abrasion resistance.

(3) Viscoelasticity Parameter

A viscoelasticity tester (ARES) produced by Rheometric Scientific Inc. was used in a twist mode to measure a viscoelasticity parameter.

Tan δ measured at 0° C. with a frequency of 10 Hz and a strain of 1% was used as an indicator of wet skid performance, and the tan δ was converted to an index relative to a result for Comparative Example 2 as 100. A higher value indicates better wet skid performance.

Tan δ measured at 50° C. with a frequency of 10 Hz and a strain of 3% was used as an indicator of a fuel-saving property, and the tan δ was converted to an index relative to a result for Comparative Example 2 as 100. A higher value indicates lower hysteresis loss and better fuel-saving performance.

In Tables 9 to 11, wet skid performance is represented as "Wet", and a fuel-saving property as "RR".

TABLE 9

|  | Comparative Example 1 | Example 1 | Comparative Example 6 |
|---|---|---|---|
| Composition Mooney viscosity | 105 | 103 | 108 |
| Abrasion resistance | 96 | 101 | 94 |
| Wet | 100 | 107 | 88 |
| RR | 86 | 88 | 92 |

TABLE 10

|  | Comparative Example 2 | Comparative Example 3 | Comparative Example 4 | Comparative Example 5 | Example 2 | Example 3 | Example 4 | Example 5 | Example 6 | Example 7 | Example 8 |
|---|---|---|---|---|---|---|---|---|---|---|---|
| Composition Mooney viscosity | 100 | 106 | 109 | 120 | 109 | 107 | 107 | 108 | 107 | 95 | 103 |
| Abrasion resistance | 100 | 99 | 90 | 92 | 108 | 106 | 107 | 102 | 105 | 112 | 111 |
| Wet | 100 | 100 | 78 | 106 | 114 | 106 | 114 | 112 | 108 | 110 | 112 |
| RR | 100 | 107 | 115 | 94 | 107 | 106 | 106 | 108 | 107 | 104 | 107 |

TABLE 11

|  | Example 9 | Example 10 | Example 11 | Example 12 | Example 13 | Example 14 | Example 15 | Example 16 | Comparative Example 7 | Comparative Example 8 |
|---|---|---|---|---|---|---|---|---|---|---|
| Composition Mooney viscosity | 108 | 110 | 111 | 106 | 114 | 106 | 104 | 97 | 103 | 118 |
| Abrasion resistance | 108 | 103 | 96 | 104 | 97 | 104 | 111 | 110 | 97 | 84 |
| Wet | 114 | 115 | 115 | 111 | 112 | 108 | 112 | 106 | 92 | 102 |
| RR | 108 | 108 | 108 | 109 | 102 | 103 | 108 | 105 | 104 | 92 |

The conjugated diene polymer compositions in Examples 1 to 16 were each superior in both abrasion resistance and processability, and each had well-balanced properties.

The present application is based on a Japanese patent application filed with Japan Patent Office on Feb. 8, 2017 (Japanese Patent Application No. 2017-021331), and the content is incorporated herein by reference.

INDUSTRIAL APPLICABILITY

The conjugated diene polymer of the present invention has industrial applicability as a material for various members such as tire treads, footwear, and products for industrial use.

The invention claimed is:

1. A conjugated diene polymer satisfying following conditions (1) to (4):
   (1) the conjugated diene polymer has two or more peaks in a molecular weight distribution curve obtained by measurement with gel permeation chromatography (GPC);
   (2) the molecular weight distribution curve contains a peak (A) having a peak molecular weight of 500,000 to 2,500,000 and a peak (B) having a peak molecular weight of 150,000 to 600,000;
   (3) a total value of an area of the peak (A) and an area of the peak (B) is 70% or more of a total area of the molecular weight distribution curve; and
   (4) an absolute value of difference between a glass transition temperature of a conjugated diene polymer in the peak (A) (Tg (A)) and a glass transition temperature of a conjugated diene polymer in the peak (B) (Tg (B)) is 2° C. to 30° C.

2. The conjugated diene polymer according to claim 1, satisfying following expression (I):

$$\mathrm{Tg}(B) > \mathrm{Tg}(A) \qquad (I).$$

3. The conjugated diene polymer according to claim 1, wherein Tg (A) is −70° C. to −15° C. and Tg (B) is −68° C. to −13° C.

4. The conjugated diene polymer according claim 1, wherein the conjugated diene polymer in the peak (A) contains 10 to 50% by mass of a vinyl aromatic compound and has a 1,2-vinyl bond content of 20 to 70%.

5. The conjugated diene polymer according to claim 1, wherein the conjugated diene polymer in the peak (B) contains 10 to 50% by mass of a vinyl aromatic compound and has a 1,2-vinyl bond content of 25 to 70%.

6. The conjugated diene polymer according to claim 1, wherein the total value of the area of the peak (A) and the area of the peak (B) is 80% or more of the total area of the molecular weight distribution curve.

7. The conjugated diene polymer according to claim 1, wherein the area of the peak (B) is 30% to 70% of the total area of the molecular weight distribution curve.

8. The conjugated diene polymer according to claim 1, wherein the absolute value of difference between the glass transition temperature of the conjugated diene polymer in the peak (A) (Tg (A)) and the glass transition temperature of the conjugated diene polymer in the peak (B) (Tg (B)) is 2° C. to 20° C.

9. The conjugated diene polymer according to claim 1, wherein a nitrogen content is 50 to 600 ppm.

10. The conjugated diene polymer according to claim 1, wherein a proportion of modified polymer chains in the conjugated diene polymer is 30 to 99%.

11. The conjugated diene polymer according to claim 1, wherein a molecular weight distribution of the peak (A) is lower than 1.50.

12. The conjugated diene polymer according to claim 1, wherein one glass transition temperature is observed in measurement with DSC.

13. The conjugated diene polymer according to claim 1, wherein the peak molecular weight of the peak (A) is higher than the peak molecular weight of the peak (B).

14. A conjugated diene polymer composition comprising:
    100 parts by mass of a rubber composition comprising the conjugated diene copolymer according to claim 1;
    1 part by mass to 150 parts by mass of a reinforcing filler; and
    0.1 parts by mass to 20 parts by mass in total of a vulcanizing agent and a vulcanization accelerator.

15. A tire comprising the conjugated diene polymer composition according to claim 14.

* * * * *